US012576429B2

(12) United States Patent \
Agapov

(10) Patent No.: US 12,576,429 B2 \
(45) Date of Patent: Mar. 17, 2026

(54) METHOD OF WETTING LOW SURFACE ENERGY SUBSTRATE AND A SYSTEM THEREFOR

(71) Applicant: W. L. Gore & Associates, Inc., Newark, DE (US)

(72) Inventor: Alexander L. Agapov, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 812 days.

(21) Appl. No.: 17/616,862

(22) PCT Filed: Jun. 5, 2020

(86) PCT No.: PCT/IB2020/055306 \
§ 371 (c)(1), \
(2) Date: Dec. 6, 2021

(87) PCT Pub. No.: WO2020/245782 \
PCT Pub. Date: Dec. 10, 2020

(65) Prior Publication Data

US 2022/0320558 A1      Oct. 6, 2022

Related U.S. Application Data

(60) Provisional application No. 62/858,159, filed on Jun. 6, 2019.

(51) Int. Cl.
| | |
|---|---|
| *B05D 3/10* | (2006.01) |
| *H01M 8/106* | (2016.01) |
| *H01M 8/1081* | (2016.01) |
| *H01M 8/10* | (2016.01) |

(52) U.S. Cl. \
CPC ............. *B05D 3/107* (2013.01); *B05D 3/101* (2013.01); *B05D 3/105* (2013.01); *H01M 8/106* (2013.01); *H01M 8/1081* (2013.01); *H01M 2008/1095* (2013.01)

(58) Field of Classification Search \
CPC ......... B05D 3/101; B05D 3/105; B05D 3/107 \
See application file for complete search history.

(56) References Cited

U.S. PATENT DOCUMENTS

| | | | |
|---|---|---|---|
| 477,432 A | 6/1892 | Miller | |
| 5,463,005 A | 10/1995 | Desmarteau | |
| 6,156,451 A * | 12/2000 | Banerjee ............. | H01M 8/0289 |
| | | | 156/228 |
| 8,739,410 B2 | 6/2014 | Michioka et al. | |
| 8,757,395 B2 | 6/2014 | Bacino et al. | |
| 2004/0126708 A1 | 7/2004 | Jing et al. | |
| 2004/0138083 A1 | 7/2004 | Kimbrell et al. | |

| | | |
|---|---|---|
| 2006/0204654 A1 | 9/2006 | Klare et al. |
| 2006/0270744 A1 | 11/2006 | Freese |
| 2010/0166961 A1 | 7/2010 | Beard |
| 2014/0314975 A1 | 10/2014 | Smith et al. |
| 2015/0314322 A1 | 11/2015 | Chang et al. |
| 2016/0159038 A1 | 6/2016 | Paxson et al. |
| 2016/0251803 A1 | 9/2016 | Tuteja et al. |

FOREIGN PATENT DOCUMENTS

| | | |
|---|---|---|
| CN | 1720274 A | 1/2006 |
| CN | 1732214 A | 2/2006 |
| CN | 101223251 A | 7/2008 |
| CN | 104769049 A | 7/2015 |
| CN | 105121036 A | 12/2015 |
| CN | 105408031 A | 3/2016 |
| CN | 107074631 A | 8/2017 |
| WO | 2009065092 A1 | 5/2009 |
| WO | 2010/083650 A1 | 7/2010 |
| WO | 2010/142772 A1 | 12/2010 |
| WO | 2016/130529 A1 | 8/2016 |

OTHER PUBLICATIONS

Yajima, Surface Modification of Polytetrafluoroethylene by Line Shaped Ar/Ethanol Atmospheric Pressure Plasma Jet, 2018 International Symposium on Dry Process, P115, p. 277-278 (Year: 2018).* \
Chernyshev et al., "Surface tension of water in the presence of perfluorocarbon vapors", Soft Matter, vol. 10, 2014, pp. 1937-1943. \
International Preliminary Report on Patentability received for PCT Patent Application No. PCT/IB2020/055306, mailed on Dec. 16, 2021, 9 pages. \
International Search Report and Written Opinion received for PCT Patent Application No. PCT/IB2020/055306, mailed on Sep. 10, 2020, 10 pages. \
Stoilov, "Fluorocarbons as Volatile Surfactants", Langmuir, vol. 14, 1998, pp. 5685-5690.

* cited by examiner

*Primary Examiner* — Tabatha L Penny

(57) ABSTRACT

There is provided a method of wetting a low surface energy substrate with a high surface tension liquid comprising at least the steps of providing a low surface energy substrate having a surface energy in the range of from 15 to 45 mN/m, a high surface tension liquid having a surface tension in the range of from greater than 25 to 70 mN/m and a low surface tension fluid having a surface tension in the range of from 10 to 25 mN/m; contacting the low surface energy substrate with the high surface tension liquid; contacting at least one of the low surface energy substrate and the high surface tension liquid with the low surface tension fluid vapour, either before, at the same time as or after the contacting of the low surface energy substrate with the high surface tension liquid; and removing the low surface tension fluid vapour from the low surface energy substrate. The high surface tension liquid can be used as a carrier liquid for a coating material, such as an ion exchange material, to be deposited on the substrate, such as ePTFE, in a method of coating. Also disclosed is a system for such coating methods.

14 Claims, 3 Drawing Sheets

METHOD OF WETTING LOW SURFACE ENERGY SUBSTRATE AND A SYSTEM THEREFOR

CROSS-REFERENCE TO RELATED APPLICATION

This application is a national phase application of PCT Application No.

PCT/IB2020/055306, internationally filed on Jun. 5, 2020, which claims the benefit of U.S. Provisional Application No. 62/858,159, filed Jun. 6, 2019, which are herein incorporated by reference in their entireties for all purposes.

TECHNICAL FIELD

This document relates to a method of wetting low surface energy substrate, such as expanded polytetrafluoroethylene (ePTFE), with a high surface tension liquid, such as water/alcohol mixtures. The wetting is achieved by treatment with a low surface tension fluid. The high surface tension liquid can be used as a carrier liquid for a coating material to be deposited on the substrate in a method of coating, such as the deposition of a tetrafluoroethylene based polymer comprising sulfonated perfluorovinylether groups onto a porous ePTFE substrate for the manufacture of a membrane for a proton-exchange membrane fuel cell. Also disclosed is a system for such methods.

BACKGROUND

Wetting is a phenomenon which describes the ability of a liquid to maintain contact with a solid surface and relates to the molecular interactions between the two materials. The higher the surface energy of a liquid compared to that of a solid, the lower the wettability and the less the contact between the two phases there usually is. Consequently, low surface energy solids, such as low surface energy substrates, for instance those formed from polymers like polytetrafluoroethylene (PTFE) and expanded PTFE (ePTFE), are poorly wetted by high surface energy liquids (also referred to as high surface tension liquids) such as aqueous or near-aqueous solutions.

Thus, a problem arises with processes, such as coating, impregnation, adsorption, or absorption related processes, which require contact between a low surface energy substrate and a high surface tension liquid. Such processes may be difficult to carry out due to lack of wetting of the solid with the liquid and/or an unacceptably slow rate of wetting of the solid with the liquid. Thus, a need therefore exists to provide an improved method of wetting a low surface energy substrate with a high surface tension liquid and a corresponding system for the same.

This problem may be mitigated by the introduction of additives to the high surface tension liquids such as surfactants and other compounds which can lower the surface tension of the liquid, thereby improving the wettability of the low surface energy substrate with the liquid. However, such additives may disrupt other properties of the liquid in addition to lowering its surface tension.

For instance, in coating processes a solid can be contacted with a carrier liquid containing a coating material to deposit the coating material onto the surface of the solid. When the carrier liquid is a high surface tension liquid, it may be treated with an additive, such as another liquid or a solid, to lower its surface tension to improve wettability with a low surface energy solid. However, the presence of the additive in the high surface tension carrier liquid may change other properties of the carrier liquid, the stability of the coating material in carrier liquid, or the additive may remain on the solid together with the coating material after solvent is removed.

For example, the presence of the additive may reduce the maximum loading of the coating material in the carrier liquid, for instance by reducing the solubility or dispersibility of the carrier material in the carrier liquid. This results in a reduction in the maximum concentration of the coating material which may be deposited, such that the coating process may have to be repeated in order to achieve a desired quantity of coating material on the solid, such as a coating weight per area loading or density. In addition, the presence of the additive may also change the viscosity of the carrier liquid, for instance by causing gelling of the carrier material, increasing the viscosity of the carrier liquid and complicating of the coating process.

Furthermore, additives such as surfactants which are introduced to lower the surface tension of the carrier liquid may become deposited on the solid with the coating material upon removal of the carrier liquid.

A need therefore exists to provide an improved coating method, and in particular an improved method of coating a low surface energy substrate with a high surface tension liquid. Such a method may minimise the alteration of one or more other properties of the high surface tension liquid (i.e. other than the surface tension of the high surface tension liquid), such as its viscosity or maximum loading of coating material, or avoid the deposition of undesirable additives on the substrate. Alternatively or additionally, such a method may accelerate the rate of coating of a low surface energy substrate with a high surface tension liquid.

SUMMARY OF THE INVENTION

In a first aspect, there is provided a method of wetting a low surface energy substrate with a high surface tension liquid comprising at least the steps of:

providing a low surface energy substrate having a surface energy in the range of from 15 to 45 mN/m, a high surface tension liquid having a surface tension in the range of from greater than 25 to 70 mN/m and a low surface tension fluid having a surface tension in the range of from 10 to 25 mN/m;

contacting the low surface energy substrate with the high surface tension liquid;

contacting at least one of the low surface energy substrate and the high surface tension liquid with the low surface tension fluid as a vapour, either before, at the same time as or after the contacting of the low surface energy substrate with the high surface tension liquid; and removing the low surface tension fluid from the low surface energy substrate after the contacting with the low surface tension fluid as a vapour.

The surface energy of the low surface energy substrate may be less than the surface tension of the high surface tension liquid. If the surface energy of the low surface energy substrate is equal to or greater than the surface tension of the high surface tension liquid, the low surface energy substrate may spontaneously wet with the high surface tension liquid.

The completion of both contacting steps (which may or may not be simultaneous) provides a low surface energy substrate wetted with the high surface tension liquid.

The contacting of at least one of the low surface energy substrate and the high surface tension liquid with the low surface tension fluid as a vapour can be carried out in a number of permutations. Such a contacting step may be carried out before, simultaneously with, or after the contacting of the low surface energy substrate with the high surface tension liquid.

In one embodiment, the contacting of at least one of the low surface energy substrate and the high surface tension liquid with the low surface tension fluid as a vapour may comprise contacting the low surface energy substrate with the low surface tension fluid as a vapour to provide a contacted low surface energy substrate before contacting the contacted low surface energy substrate with the high surface tension liquid to provide a low surface energy substrate wetted with the high surface tension liquid, such as a contacted low surface energy substrate wetted with the high surface tension liquid.

In another embodiment, the contacting of at least one of the low surface energy substrate and the high surface tension liquid with the low surface tension fluid as a vapour may comprise contacting the high surface tension liquid with the low surface tension fluid as a vapour to provide a contacted high surface tension liquid before contacting the low surface energy substrate with the contacted high surface tension liquid to provide a low surface energy substrate wetted with the high surface tension liquid, such as a low surface energy substrate wetted with the contacted high surface tension liquid.

In another embodiment, the contacting of the at least one of the low surface energy substrate and the high surface tension liquid with the low surface tension fluid as a vapour comprises contacting both the low surface energy substrate and the high surface tension liquid with the low surface tension fluid as a vapour to provide a contacted low surface energy substrate and a contacted high surface tension liquid before contacting the contacted low surface energy substrate with the contacted high surface tension liquid to provide a low surface energy substrate wetted with the high surface energy liquid, such as a contacted low surface energy substrate wetted with a contacted high surface energy liquid.

For instance, the contacting of at least one of the low surface energy substrate and the high surface tension liquid with the low surface tension fluid as a vapour may comprise contacting the low surface energy substrate with the low surface tension fluid as a vapour to provide a contacted low surface energy substrate and contacting the high surface tension liquid with the low surface tension fluid as a vapour to provide a contacted high surface tension liquid before the contacting of the contacted low surface energy substrate with the contacted high surface tension liquid to provide a low surface energy substrate wetted with a high surface tension liquid, such as a contacted low surface energy substrate wetted with a contacted high surface tension liquid.

In another embodiment, the contacting of the low surface energy substrate with the high surface tension liquid can occur before the contacting of at least one of the low surface energy substrate and the high surface tension liquid with the low surface tension fluid as a vapour. For instance, the low surface energy substrate may be contacted with the high surface tension liquid to provide a low surface energy substrate contacted with the high surface tension liquid. The low surface energy substrate contacted with the high surface tension liquid can then be subsequently contacted with the low surface tension fluid as a vapour to provide a low surface energy substrate wetted with a high surface tension liquid, such as a contacted low surface energy substrate wetted with a contacted high surface tension liquid.

In another embodiment, the contacting of at least one of the low surface energy substrate and the high surface tension liquid with the low surface tension fluid as a vapour comprises simultaneously contacting both the low surface energy substrate and the high surface tension liquid with the low surface tension fluid as a vapour at the same time as the contacting of the low surface energy substrate with the high surface tension liquid to provide a low surface energy substrate wetted with a high surface tension liquid, such as a contacted low surface energy substrate wetted with a contacted high surface tension liquid.

The low surface energy substrate is a substrate having a surface energy of in the range of from 15 to 45 mN/m, typically from 18 to 45 mN/m.

The low surface energy substrate may be preferably one or more selected from the group comprising organohalide polymers, hydrocarbon polymers and copolymers comprising organohalide polymers, with the proviso that the substrate has a surface energy of in the range of from 15 to 45 mN/m. Examples of organohalide polymers include polytetrafluoroethylene, polytrifluoroethylene, polyvinylidene fluoride, polyvinylidene chloride, polychlorotrifluoroethylene, polyvinyl fluoride, and polyvinyl chloride. The copolymers comprising organohalide polymers may be copolymers of organohalide polymers and hydrocarbon polymers. Examples of such copolymers include polyethylene-co-tetrafluoroethylene and polytetrafluoroethylene-co-hexafluoropropylene. Examples of hydrocarbon polymers include polyethylene, including ultra-high molecular weight polyethylene (UHMWPE), polypropylene, polystyrene, and polypara-xylylene.

In another embodiment, when the low surface energy substrate is organohalide polymer, it is expanded polytetrafluoroethylene (ePTFE). The ePTFE may have a thickness of from 0.5 to 500 μm. The ePTFE may have a bubble point of from 10 to 2000 kPa. The ePTFE may have a mass per area from 0.1 to 500 g/m$^2$. The ePTFE may have an apparent density of from 0.1 to 1 g/cc. For instance, the ePTFE may have a mass per area of 4.7 g/m$^2$, a thickness of 14 μm, an apparent density of 0.34 g/cc and a bubble point of 324 kPa (47.0 psi).

In another embodiment, when the low surface energy substrate is hydrocarbon polymer, it is expanded polypropylene (ePP). The ePP may have a thickness of from 0.5 to 500 μm. The ePP may have a bubble point of from 10 to 2000kPa. The ePP may have a mass per area from 0.1 to 500 g/m$^2$. The ePP may have an apparent density of from 0.05 to 0.5 g/cc. For instance, the ePP may have a mass per area of 17 g/m$^2$, a thickness of 110 μm, an apparent density of 0.15 g/cc and a bubble point of 103 kPa (15.0 psi).

In another embodiment, the low surface energy substrate is a low surface energy porous substrate.

The high surface tension liquid has a surface tension of from greater than 25 to 70 mN/m. As described in the experimental section below, the surface tension of the high surface tension liquid may be measured according to ASTM D1331-14.

The high surface tension liquid is in the liquid phase at ambient temperature or at the temperature at which the method described herein is conducted or the system described herein is employed.

The high surface tension liquid may be a liquid composition comprising one or more components. The one or more components may have any surface tension value so long as the liquid composition has a surface tension of from greater than 25 up to 70 mN/m.

The one or more components may include one or more high surface tension liquid components and optionally one or more further components.

The one or more further components may be selected from one or more of a low surface tension liquid component, surfactant, dispersant, and coating material or mixture of coating materials, preferably one or more of a low surface tension liquid component, coating material or mixture of coating materials.

The one or more high surface tension liquid components may be selected from the group comprising water, diiodomethane, formamide, glycerol, 2,2'-thiobisethanol, 2-furanmethanol, ethylene glycol, 2-aminoethanol, 1,3-butandiol, propylene glycol, 1,2,3-tribromo propane, 1,5-pentanediol, N-methyl-2pyrrolidine, aniline, 2-aminoethanol, dimethyl sulfoxide, propylene carbonate, anthranilic acid ethylester, anthranilic acid methylester, benzyl alcohol, benzyl benzenoate, bromoform, quinoline, 1,3-diiodomethane, diethylene glycol, furfural, hexachlorobutadiene, iodobenzene, m-nitrotoluene, methyl naphthalene, N,N-dimethyl acetamide, N,N-dimethyl formamide, N-methyl-2-pyrrolidone, nitrobenzene, nitrom ethane, o-nitrotoluene, p-nitrotoluene, phenylisothiocyanate, phthalic acid diethylester, polyethylene glycol, pyridine, 3-pyridylcarbinol, pyrrole, tetrabromoethane, tricresylphosphate, α-bromonaphthalene, α-chloronaphthalene, 1,2-dichloroethane, 1,4-dioxane, carbon disulphide, chlorobenzene, cyclohexanol, cyclopentanol, decalin, dipropylene glycol, dodecyl benzene, fumaric acid diethylester, nitroethane, nitropropane, acetonitrile, propanoic acid, xylene and its isomers, dipropylene glycol monomethylether, toluene, butyronitrile, acetic acid, chloroform, acrylonitrile, 2-butoxyethanol, tetrachloromethane, 2-heptanone, dichloromethane, tetrahydrofuran, hexanol or its isomers, heptanol and its isomers, octanol and its isomers, and isovaleronitrile. The high surface tension liquid components in the foregoing list have surface tensions of greater than 25 mN/m and with the exception of water have surface tensions in the range of greater than 25 to 70 mN/m. The one or more high surface tension liquid components may have a surface tension which exceeds the upper limit of 70 mN/m which is required for the high surface tension liquid, such as water which has a surface tension of about 72 mN/m, as long as the high surface tension liquid composition has a surface tension in the range of from greater than 25 up to 70 mN/m.

The high surface tension liquid composition may also comprise one or more low surface tension liquid components (relative to water) to provide the required surface tension for the liquid composition of from greater than 25 to 70 mN/m, optionally in combination with one or both of a coating material and a mixture of coating materials.

The one or more low surface tension liquid components may be selected from the group comprising may be preferably selected from one or more of the compounds selected from aldehydes, alcohols, amines, ketones, ethers, cyclic ethers, esters, organohalides with the proviso that the low surface tension liquid components in the foregoing list have surface tensions in the range of from 10 to 25 mN/m.

The one or more low surface tension liquid components may be one or more selected from the group comprising trifluoroethanol, diethyl ether, dimethoxymethane, silicon tetrachloride, butylchloride and its isomers, propanol and its isomers, ethanol, methanol, butanol and its isomers, pentanol and its isomers, acetone, ethyl acetate, methyl isobutyl ketone, propyl acetate, methyl ethyl ketone, methyl methacrylate, methyl acetate, acetone, methyl chloroform, ethanal, propanal, butanal, methylamine, ethylamine, propylamine, butylamine, and pentylamine. The low surface tension liquid components in the foregoing list have surface tensions in the range of from 10 to 25 mN/m.

In one embodiment, the high surface tension liquid composition comprises water and ethanol, with the proviso that the composition has a surface tension in the range of from greater than 25 to 70 mN/m. For instance, the high surface tension liquid composition may comprise from 1 wt. % to 65 wt. % ethanol in water.

The optional coating material may be an inorganic or organic material. The coating material may be a particle or solute. The coating material can be an ion conducting or ion exchange material (IEM), such as tetrafluoroethylene based polymer comprising sulfonated perfluorovinylether groups. Suitable ion exchange materials include, for example, perfluorosulfonic acid polymers, perfluorocarboxylic acid polymers, perfluorophosphonic acid polymers, styrenic ion exchange polymers, fluorostyrenic ion exchange polymers, sulfonated polyether ether ketone ion exchange polymers, polyarylether ketone ion exchange polymers, polysulfone ion exchange polymers, bis(fluoroalkylsulfonyl)imides, (fluoroalkylsulfonyl)(fluorosulfonyl)imides, polyvinyl alcohol, polyethylene oxides, metal salts with or without a polymer, and mixtures thereof. In exemplary embodiments, the ion exchange material comprises perfluorosulfonic acid (PFSA) polymers made by copolymerization of tetrafluoroethylene and perfluorosulfonyl vinyl ester with conversion into proton form. Examples of suitable perfluorosulfonic acid polymers for use in fuel cell applications include Nafion® (E.I. DuPont de Nemours, Inc., Wilmington, Del., US), Flemion® (Asahi Glass Co. Ltd., Tokyo, JP), Aciplex® (Asahi Kasei Corporation Tokyo, JP), Aquivion® (Solvay Solexis S.P.A, Italy), and 3MTM (3M Innovative Properties Company, USA) which are commercially available perfluorosulfonic acid copolymers. Other examples of suitable perfluorosulfonic acid polymers for use in fuel cell applications include perfluorinated sulfonyl (co)polymers such as those described in U.S. Pat. No. 5,463,005.

In one embodiment, the high surface tension liquid does not spontaneously wet the low surface energy substrate in the absence of the low surface tension fluid. In one embodiment, the high surface tension liquid may have a surface tension which is greater than the surface energy of the low surface energy substrate by value of 4 mN/m or more, preferably by 7 mN/m or more, more preferably by 10 mN/m or more and still more preferably by 15 mN/m or more.

In another embodiment, the high surface tension liquid may wet the low surface energy substrate, but the rate of wetting is increased by the addition of the low surface tension fluid.

The low surface tension fluid, which when in liquid form, has a surface tension in a range of from 10 to 25 mN/m. As described in the experimental section below, the surface tension of the low surface tension fluid, when in liquid form, may be measured according to ASTM D1331-14.

The low surface tension fluid, such as the low surface tension fluid as a vapour, may be preferably selected from one or more of the compounds selected from aldehydes, alcohols, amines, ketones, ethers, cyclic ethers, esters, and organohalides, with the proviso that said compounds have a surface tension in a range of from 10 to 25 mN/m.

The low surface tension fluid, such as the low surface tension fluid as a vapour, may be one or more selected from the group comprising trifluoroethanol, diethyl ether, dimethoxymethane, silicon tetrachloride, butylchloride and its isomers, propanol and its isomers, ethanol, methanol, butanol and its isomers, pentanol and its isomers, acetone, ethyl acetate, methyl isobutyl ketone, propyl acetate, methyl ethyl ketone, methyl methacrylate, methyl acetate, acetone, methyl chloroform, ethanal, propanal, butanal, methylamine, ethylamine, propylamine, butylamine, and pentylamine. The low surface tension fluids in the foregoing list have surface tensions in the range of from 10 to 25 mN/m.

The low surface tension fluid, such as the low surface tension fluid as a vapour, may be still more preferably selected from one or more of the group comprising, 2,2,2-trifluoroethanol, 1-butanol, ethyl acetate, and diethyl ether. Such preferred low surface tension fluids, when in liquid form, have a surface tension in the range of from 10 to 25 mN/m.

In another embodiment, the low surface tension fluid is 2,2,2-trifluoroethanol, which has a surface tension of about 17 mN/m.

In another embodiment, the step of removing the low surface tension fluid, such as the low surface tension fluid vapour or liquid, from the low surface energy substrate may further comprise the removal of the high surface tension liquid i.e. removing the low surface tension fluid (as a vapour or liquid) and the high surface tension liquid.

In a second aspect, the method of the first aspect and its embodiments is a method of coating the low surface energy substrate with the high surface tension liquid comprising a coating material, the method comprising at least the steps of:

providing a low surface energy substrate having a surface energy in the range of from 15 to 45 mN/m, a low surface tension fluid vapour having a surface tension in the range of from 10 to 25 mN/m and a high surface tension liquid having a surface tension in the range of from greater than 25 to 70 mN/m, said high surface tension liquid comprising a coating material;

contacting the low surface energy substrate with the high surface tension liquid comprising the coating material;

contacting at least one of the low surface energy substrate and the high surface tension liquid comprising the coating material with the low surface tension fluid as a vapour, either before, at the same time as or after the contacting of the low surface energy substrate with the high surface tension liquid; and removing the low surface tension fluid from the low surface energy substrate after the contacting with the low surface tension fluid as a vapour.

The completion of both contacting steps (which may or may not be simultaneous) provides a low surface energy substrate coated with the high surface tension liquid comprising the coating material.

In one embodiment of the method of the second aspect and its embodiments, the method further comprises the step of removing the high surface tension liquid from the low surface energy substrate to provide a low surface energy substrate coated with the coating material.

In another embodiment, the coating material is an ion exchange material (IEM), as defined above.

In another embodiment of the method of the second aspect and its embodiments, the low surface energy substrate is a porous ePTFE membrane for a fuel cell application.

In another embodiment of the method of the second aspect and its embodiments, the coating material is an ion exchange material, such as tetrafluoroethylene based polymer comprising sulfonated perfluorovinylether groups. Porous ePTFE membranes impregnated with tetrafluoroethylene based polymer comprising perfluorovinylether groups are desirable membrane materials for proton-exchange membrane fuel cells.

In another embodiment, the method of the first or second aspect and their embodiments may be a continuous process, such as a roll-to-roll process or a discontinuous process, such as a batch-wise process.

In a third aspect, there is provided a system for wetting a low surface energy substrate with a high surface energy liquid comprising:

a high surface tension liquid applicator comprising a high surface tension liquid having a surface tension in the range of from greater than 25 to 70 mN/m to contact a low surface energy substrate having a surface energy in the range of from 15 to 45 mN/m with the high surface tension liquid;

a low surface tension fluid vapour applicator comprising a low surface tension fluid having a surface tension in the range of from 10 to 25 mN/m to contact at least one of a low surface energy substrate and the high surface tension liquid with the low surface tension fluid as a vapour either before, at the same time as or after the contacting of the low surface energy substrate with the high surface tension liquid;

a separator to separate the low surface tension fluid from the low surface energy substrate after the contact with the low surface tension fluid.

The system of the third aspect can be used with the methods of the first and second aspects and their embodiments.

The system of the third aspect may be operated continuously or discontinuously. Examples of continuous systems are roll-to-roll systems, such as those discussed below. Alternatively, examples of discontinuous systems are batch-wise systems.

As used herein, the high surface tension liquid applicator may contact, or be a means for contacting, or may be adapted to contact, a high surface tension liquid to a low surface energy substrate. The high surface tension liquid applicator may be one or more selected from the group comprising a spray applicator, jet coater, a roll-to-roll release liner applicator, a dip coater, a forward or reverse roll coater, a direct or offset gravure roll, a squeeze roll coater, a comma, rod, air knife coater, knife over roll coater, a slot die, including a multicavity slot die, and a slide die.

As used herein, the low surface tension fluid vapour applicator may contact, or be a means for contacting, or may be adapted to contact, one or both of a low surface energy substrate and the high surface tension liquid with a low surface tension fluid as a vapour. The low surface tension fluid vapour applicator may be one or more selected from the group comprising an evaporator and a pressure reduction valve. An evaporator may be used when the low surface tension fluid is a liquid at ambient temperature and pressure. A pressure reduction valve may be used when the low surface tension fluid is a gas at ambient temperature and pressure and is stored under pressure, for instance as a pressurised liquid.

As used herein, the separator may remove, or be a means from removing, or may be adapted to remove, low surface tension fluid from the low surface energy substrate. In one embodiment, the separator further separates the high surface tension fluid from the low surface energy substrate.

Preferably, the separator removes the low surface tension fluid and the high surface tension liquid from the low surface energy substrate. The separator may be a mechanical separator if there is no coating material present. Alternatively, the separator may reduce the pressure and/or increase the temperature to evaporate the low surface tension fluid and optionally the high surface tension liquid, particularly if a coating material is present. Preferably, the separator is a heating device, such as a convection oven, hot air blower, or IR lamp.

In one embodiment of the system, there is provided a contacting chamber to contact at least one of the low surface energy substrate and the high surface tension liquid with the low surface tension fluid vapour. The contacting chamber comprises at least the low surface tension fluid vapour applicator. In some embodiments, the contacting chamber further comprises the high surface tension liquid applicator.

In another embodiment of the system, the high surface tension liquid applicator comprises:

a release liner comprising the high surface tension liquid, said release liner capable of reversibly absorbing the high surface tension liquid; and a contactor to contact the low surface energy substrate with the release liner comprising the high surface tension liquid.

As used herein, the contactor may contact, or may be a means for contacting, or may be adapted to contact, the low surface energy substrate with the release liner.

In one embodiment of the system, the contactor is a rotating element device comprising the release liner and contacting means. The rotating element device may comprise at least first and second contacting rotating elements, such as first and second rollers. The release liner comprising the high surface tension liquid may be contacted with the low surface energy substrate with the at least first and second release liner rotating elements.

In another embodiment, the rotating element device may further comprise at least one, preferably two, compressing rotating element(s) to compress the release liner and separate the high surface tension liquid from it and transfer it to the low surface energy substrate.

In another embodiment of the third aspect, the system further comprises a separation chamber comprising the separator to remove at least the low surface tension fluid and optionally the high surface tension liquid from the wetted low surface energy substrate. The separation chamber may place the low surface tension fluid and optionally the high surface tension liquid under one or both of reduced pressure or increased temperature (compared to ambient) in order to vaporise the low surface tension fluid and optionally the high surface tension liquid. The separation chamber may comprise a heater, such as a convection oven, hot air blower, or IR lamp.

In another embodiment of the system, the high surface tension liquid comprises a coating material to be deposited on the low surface energy substrate.

FIGURES

In order to further explain the present invention and its advantages, a more detailed description is provided with reference to the embodiments below which are illustrated by the following Figures. It should be appreciated that these Figures relate to a typical embodiment of the invention and its advantages, and are therefore not to be considered as limiting the scope of the invention, which is defined by the appended claims.

FIG. 1B shows a lower contact angle than that of FIG. 1A, indicating improved wetting.

DETAILED DESCRIPTION

Disclosed herein is a method and system for wetting a low surface energy substrate with a high surface tension liquid. The method and system utilise a low surface tension fluid as a vapour to facilitate the wetting and/or to speed up the wetting.

The term 'wetting' refers to the ability of a liquid to spread upon contact with a solid surface, such as the surface of a substrate. This contact results from molecular interactions between the liquid and solid when they are brought together. The degree of wetting, and therefore degree of contact between the liquid and the solid, is determined by the balance of the adhesive forces between the liquid and the solid and the cohesive forces resulting from the mutual attraction of the atoms or molecules within the liquid or within the solid.

Figure 1A:
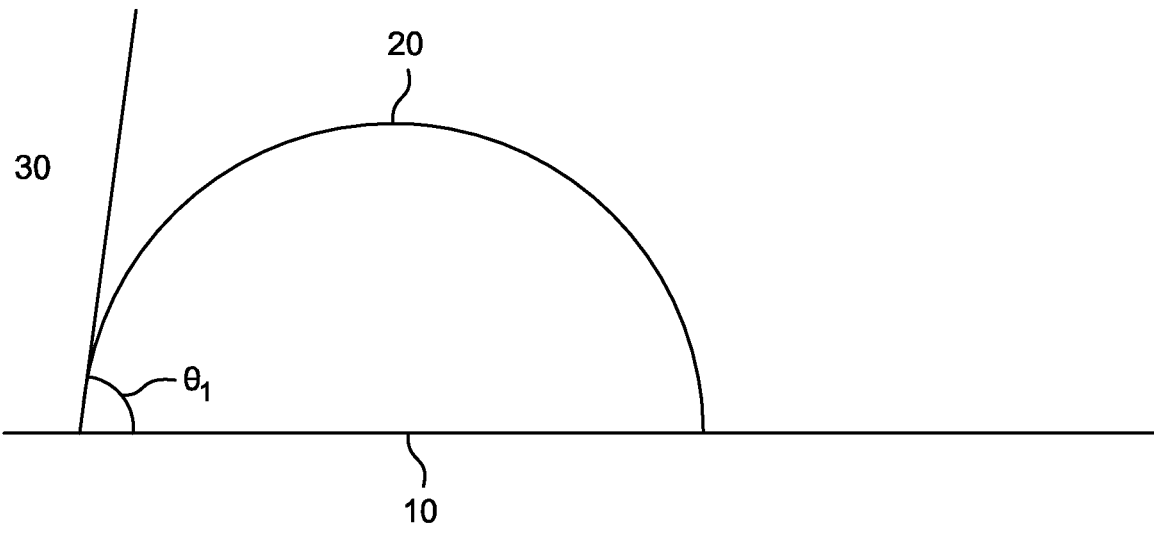
FIGS. 1A and 1B show schematic representations of the contact angle between a solid-liquid interface and a liquid-vapour interface, which is representative of the degree of wetting of the solid by the liquid.
Figure 1B:
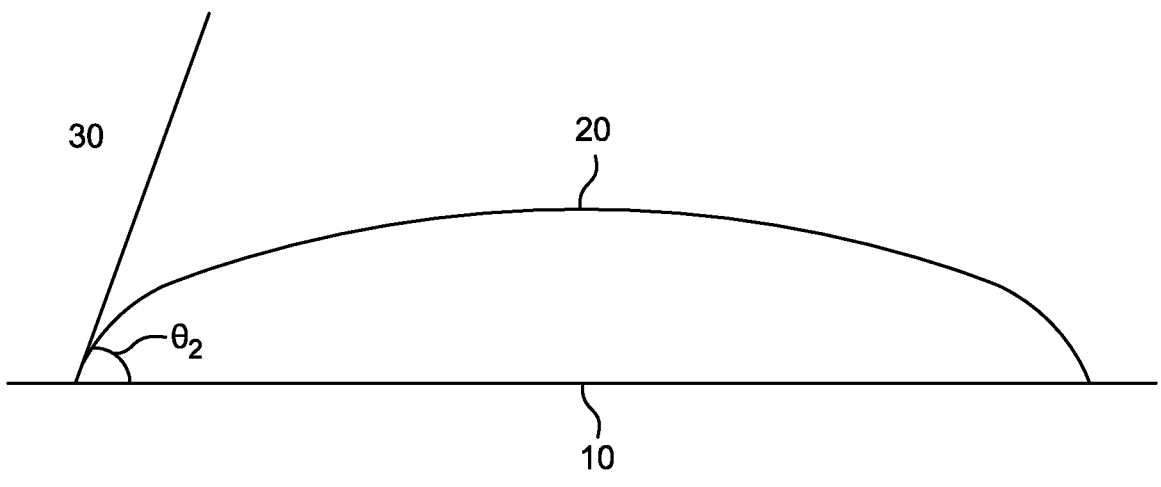

This balance of adhesive and cohesive forces determines the contact angle, $\theta$, which is the angle at which the liquid-vapour interface meets the solid-liquid interface. A low contact angle of less than 90° indicates a high degree of wetting. A contact angle of from 90° to less than 180° indicates a low degree of wetting. FIGS. 1A and 1B illustrate two examples of contact angles $\theta$ between a solid 10, a liquid 20 and the atmosphere (vapour) 30. FIG. 1A shows a contact angle $\theta_1$, which is greater than the contact angle $\theta_2$ shown in FIG. 1B, indicating that poorer wetting occurs between the solid 10 and liquid 20 in FIG. 1A compared to that in FIG. 1B.

In the present context, the contact angle is the angle at which the high surface tension liquid-atmosphere interface meets the low surface energy substrate-high surface tension liquid interface.

The contact angle can be measured by a number of methods known in the art, such as the static or dynamic sessile drop methods, the pendant drop method, the single-fibre Wilhemy method or the single-fibre meniscus method.

The method and system disclosed herein increases the contact between the high surface tension liquid and the low energy tension substrate using a low surface tension fluid vapour. This increase in contact is reflected in a decrease in the contact angle (compared to the contact angle between the high surface tension liquid and the low surface energy substrate in the absence of the low surface tension fluid).

The cohesive forces between the atoms or molecules in a liquid can be characterised by the surface tension of the liquid. This is the elastic tendency of a liquid surface, which makes it acquire the least surface area possible. Atoms or molecules on the surface of a liquid do not experience the same environment as those in the bulk because those on the surface do not have liquid molecules on all sides and therefore experience an inward pull. Surface tension has the dimension of force per unit length (e.g. mN/m), which can also be represented as energy per unit area. The former dimension of force per unit length is used herein. The term surface tension for liquids can be used interchangeably with surface energy. As used herein, surface tension is used in relation to liquids and vapours whilst surface energy is used for solids.

Analogously, the surface energy of a solid reflects the disruption of intermolecular bonds that occur when a surface is created.

The degree of wetting of a solid surface reflects a change in the surface energy of a solid when it comes into contact with a liquid. The lower the surface energy of the solid and the higher the surface tension of a liquid, the lower the degree of wetting.

Solids may be surface treated to enhance wetting, for instance by corona treatment, plasma treatment or acid etching. Such treatments increase the surface energy of the solid. However, such treatments may not be compatible with the solid, or may permanently change the surface energy of the solid which can undesirably alter the properties of the solid required for a particular purpose.

Similarly, liquids may be treated to enhance wetting, for instance by the addition of an additive such as a surfactant. The addition of a surfactant can lower the surface tension of a liquid. However, such additives may have the problem that they are difficult to remove, either from the liquid or from a solid contacted by the liquid. For instance, in coating processes where a coating material is present in a liquid carrier, an additive such as a surfactant may also deposit onto the solid in addition to the coating material, upon removal of the liquid carrier. Such additives may have a low vapour pressure and may therefore be difficult to remove from the solid, particularly without also removing the coating material.

The method and system disclosed herein enables a substrate having a low surface energy to be wetted with a liquid having a high surface tension, without requiring the surface treatment of the substrate and/or the addition of surfactant to the liquid. The method and system disclosed herein therefore provide an improvement in the wetting of a low surface energy substrate with a high surface tension liquid.

The method of wetting a low surface energy substrate with a high surface tension liquid may be a method of improving the wetting of a low surface energy substrate with a high surface tension liquid. Such an improvement can be measured by a reduction of the contact angle between (i) the low surface energy substrate and high surface tension liquid interface and (ii) the high surface tension liquid and the vapour (atmosphere) interface upon contacting with the low surface tension fluid vapour, when compared to the contact angle between (i) the low surface energy substrate and high surface tension liquid interface and (ii) the high surface tension liquid and the vapour (atmosphere) interface in the absence of the low surface tension fluid vapour.

Alternatively, an improvement in wetting may be measured by the substrate clarification method used in the Examples below.

The method of wetting a low surface energy substrate with a high surface tension liquid may be alternatively or additionally a method of increasing the rate of wetting of a low surface energy substrate with a high surface tension liquid.

In one step of the method disclosed herein, a low surface energy substrate is contacted with a high surface tension liquid.

As used herein, the term "contacting" is intended to mean that the high surface tension liquid is brought into contact with the low surface energy substrate so that they are touching. The described method and system may improve the degree of contact between the high surface tension liquid and the low surface energy substrate, compared to the degree of contact in the absence of the low surface tension fluid.

Low Surface Energy Substrate

As used herein, the term "low surface energy substrate" refers to a substrate having a surface energy in the range of from 15 to 45 mN/m, typically from 18 to 45 mN/m. Preferably the low surface energy substrate has a surface energy in the range of from 15 to 40 mN/m, typically from 18 to 40 mN/m. More preferably the low surface energy substrate has a surface energy in the range of from 15 to 35 mN/m, typically from 18 to 35 mN/m. Still more preferably the low surface energy substrate has a surface energy in the range of from 15 to 30 mN/m, typically from 18 to 30 mN/m. As described in the experimental section below, the surface energy of a substrate may be measured according to ASTM D7490-13.

The low surface energy substrate may be in the form of one or more of the group comprising a film, a membrane or a tape.

As used herein a tape is a substrate having a thickness being at least one order of magnitude smaller than width or length.

The low surface energy substrate may have a thickness in the range of: from 0.5 to 500 μm; from 0.5 to 250 μm; from 0.5 to 100 μm; from 0.5 to 50 μm; from 5 to 30 μm; or from 3 to 20 μm.

The low surface energy substrate may have a mass per area in the range of: from 0.1 to 500 $g/m^2$; from 0.1 to 250 $g/m^2$; from 0.1 to 100 $g/m^2$; from 0.1 to 50 $g/m^2$; from 0.1 to 25 $g/m^2$; from, 0.1 to 10 $g/m^2$; from 0.5 to 6 $g/m^2$; or from 1 to 5 $g/m^2$.

The low surface energy substrate may be preferably one or more selected from the group comprising organohalide polymers, hydrocarbon polymers and copolymers comprising organohalide polymers. Examples of organohalide polymers include polytetrafluoroethylene, polytrifluoroethylene, polyvinylidene fluoride, polyvinylidene chloride, polychlorotrifluoroethylene, polyvinyl fluoride, and polyvinyl chloride. The copolymers comprising organohalide polymers may be copolymers of organohalide polymers and hydrocarbon polymers. Examples of such copolymers include polyethylene-co-tetrafluoroethylene and polytetrafluoroethylene-co-hexafluoropropylene. Examples of hydrocarbon polymers include polyethylene, including ultra-high molecular weight polyethylene (UHMWPE), polypropylene, polystyrene, and polypara-xylylene.

The low surface energy substrate may be one or more selected from the group comprising polytrifluoroethylene, polytetrafluoroethylene and polydimethylsiloxane, isotactic polypropylene, polyisobutylene, polyvinylidene fluoride, polychlorotrifluoroethylene, polybutylmethacrylate, polyisobutylmethacrylate, polytertbutylmethacrylate, polyhexylmethacrylate, polytetramethylene oxide, polycarbonate, linear polyethylene, branched polyethylene, poly-α-methyl styrene, polyvinyl fluoride, polyvinyl acetate, polyethyl acrylate, polyethyl methacrylate, polystyrene, polyvinyl chloride, polyvinylidene chloride, polymethylacrylate, polymethyl methacrylate, polyethylene oxide, polyethylene terephthalate, polyamide-12, and polyetheretherketone. Such low surface energy substrates have a surface energy in the range of from 18 to 45 mN/m.

The low surface energy substrate may be preferably one or more selected from the group comprising polytrifluoroethylene, polytetrafluoroethylene and polydimethylsiloxane, isotactic polypropylene, polyisobutylene, polyvinylidene fluoride, polychlorotrifluoroethylene, polybutylmethacrylate, polyisobutylmethacrylate, polytertbutylmethacrylate, polyhexylmethacrylate, polytetramethylene oxide, polycarbonate, linear polyethylene, branched polyethylene, poly-α-methyl styrene, polyvinyl fluoride, polyvinyl acetate, polyethyl acrylate, and polyethyl methacrylate. Such preferred low surface energy substrates have a surface energy in the range of from 18 to 40 mN/m.

The low surface energy substrate may be more preferably one or more selected from the group comprising polytrifluoroethylene, polytetrafluoroethylene and polydimethylsiloxane, isotactic polypropylene, polyisobutylene, polyvinylidene fluoride, polychlorotrifluoroethylene, polybutylmethacrylate, polyisobutylmethacrylate, polytert-butylmethacrylate, polyhexylmethacrylate, polytetramethylene oxide and polycarbonate. Such preferred low surface energy substrates have a surface energy in the range of from 18 to 35 mN/m.

The low surface energy substrate may be still more preferably one or more selected from the group comprising polytrifluoroethylene, polytetrafluoroethylene and polydimethylsiloxane. Such preferred low surface energy substrates have a surface energy in the range of from 18 to 30 mN/m.

Most preferably, the low surface energy substrate is expanded polytetrafluoroethylene (ePTFE). The ePTFE may have a thickness of from 0.5 to 500 μm. The ePTFE may have a bubble point of from 10 to 2000 kPa. The ePTFE may have a mass per area from 0.1 to 500 g/m². The ePTFE may have an apparent density of from 0.1 to 1 g/cc. For instance, the ePTFE may have a mass per area of 4.7 g/m², a thickness of 14 μm, an apparent density of 0.34 g/cc and a bubble point of 324 kPa (47.0 psi).

High Surface Tension Liquid

As used herein, the term "high surface tension liquid" refers to a liquid having a surface tension in a range of from greater than 25 to 70 mN/m. Preferably the high surface tension liquid has a surface tension of in the range of from 35 to 50 mN/m. Preferably the high surface tension liquid has a surface tension in the range of from greater than 25 to 70 mN/m, more preferably from greater than 25 to 65 mN/m, still more preferably from greater than 25 to 60 mN/m. Alternatively, the high surface tension liquid preferably has a surface tension in the range of from 30 to 60 mN/m, more preferably from 30 to 50 mN/m. As described in the experimental section below, the surface tension of the high surface tension liquid may be measured according to ASTM D1331-14.

The high surface tension liquid may be a liquid composition comprising one or more components. The one or more components may have any surface tension value so long as the liquid composition has a surface tension of from greater than 25 to 70 mN/m.

The one or more components may include one or more high surface tension liquid components and optionally one or more further components.

The one or more further components may be selected from one or more of a low surface tension liquid component, a coating material and a mixture of coating materials. When a coating material or mixture of coating materials is present in the high surface tension liquid composition, the low surface tension liquid component may act as a co-solvent for the coating material(s).

The high surface tension liquid component may be one or more selected from the group comprising water, diiodomethane, formamide, glycerol, 2,2'-thiobisethanol, 2-furanmethanol, ethylene glycol, 2-aminoethanol, 1,3-butandiol, propylene glycol, 1,2,3-tribromo propane, 1,5-pentanediol, N-methyl-2pyrrolidine, aniline, 2-aminoethanol, dimethyl sulfoxide, propylene carbonate, anthranilic acid ethylester, anthranilic acid methylester, benzyl alcohol, benzyl benzenoate, bromoform, quinoline, 1,3-diiodomethane, diethylene glycol, furfural, hexachlorobutadiene, iodobenzene, m-nitrotoluene, methyl naphthalene, N,N-dimethyl acetamide, N,N-dimethyl formamide, N-methyl-2-pyrrolidone, nitrobenzene, nitrom ethane, o-nitrotoluene, phenylisothiocyanate, phthalic acid diethylester, polyethylene glycol, pyridine, 3-pyridylcarbinol, pyrrole, tetrabromoethane, tricresylphosphate, α-bromonaphthalene, α-chloronaphthalene, 1,2-dichloroethane, 1,4-dioxane, carbon disulphide, chlorobenzene, cyclohexanol, cyclopentanol, decalin, dipropylene glycol, dodecyl benzene, fumaric acid diethylester, nitroethane, nitropropane, acetonitrile, propanoic acid, xylene and its isomers, dipropylene glycol monomethylether, toluene, butyronitrile, acetic acid, chloroform, acrylonitrile, 2-butoxyethanol, tetrachloromethane, 2-heptanone, dichloromethane, tetrahydrofuran, hexanol or its isomers, heptanol and its isomers, octanol and its isomers, and isovaleronitrile. The high surface tension liquid components in the foregoing list have surface tensions of greater than 25 mN/m.

The high surface tension liquid component may be preferably one or more selected from the group comprising water, diiodomethane, formamide, glycerol, 2,2'-thiobisethanol, 2-furanmethanol, ethylene glycol, 2-aminoethanol, 1,3-butandiol, propylene glycol, 1,2,3-tribromo propane, 1,5-pentanediol, N-methyl-2pyrrolidine, aniline, 2-aminoethanol, dimethyl sulfoxide, propylene carbonate, anthranilic acid ethylester, anthranilic acid methylester, benzyl alcohol, benzyl benzenoate, bromoform, quinoline, 1,3-diiodomethane, diethylene glycol, furfural, hexachlorobutadiene, iodobenzene, m-nitrotoluene, methyl naphthalene, N,N-dimethyl acetamide, N,N-dimethyl formamide, N-methyl-2-pyrrolidone, nitrobenzene, nitromethane, o-nitrotoluene, phenylisothiocyanate, phthalic acid diethylester, polyethylene glycol, pyridine, 3-pyridylcarbinol, pyrrole, tetrabromoethane, tricresylphosphate, α-bromonaphthalene, and α-chloronaphthalene, 1,2-dichloroethane, 1,4-dioxane, carbon disulphide, chlorobenzene, cyclohexanol, cyclopentanol, decalin, dipropylene glycol, dodecyl benzene, fumaric acid diethylester, nitroethane. In the foregoing list, the high surface tension liquid components with the exception of water have a surface tension within the range of from 30 to 70 mN/m.

The one or more high surface tension liquid components may have a surface tension which exceeds the upper limit of 70 mN/m which is required for the high surface tension liquid, such as water which has a surface tension of about 72 mN/m, as long as the high surface tension liquid composition has a surface tension in the range of from greater than 25 up to 70 mN/m.

The high surface tension liquid component may be even more preferably one or more selected from the group comprising water, ethylene glycol, 2-aminoethanol, 1,3-butandiol, propylene glycol, 1,2,3-tribromo propane, 1,5-pentanediol, N-methyl-2pyrrolidine, aniline, 2-aminoethanol, dimethyl sulfoxide, propylene carbonate, anthranilic acid ethylester, anthranilic acid methylester, benzyl alcohol, benzyl benzenoate, bromoform, quinoline, 1,3-diiodomethane, diethylene glycol, furfural, hexachlorobutadiene, iodobenzene, m-nitrotoluene, methyl naphthalene, N,N-dimethyl acetamide, N,N-dimethyl formamide, N-methyl-2-pyrrolidone, nitrobenzene, nitromethane, o-nitrotoluene, phenylisothiocyanate, phthalic acid diethylester, polyethylene glycol, pyridine, 3-pyridylcarbinol, pyrrole, tetrabromoethane, tricresylphosphate, α-bromonaphthalene, and α-chloronaphthalene 1,2-dichloroethane, 1,4-dioxane, carbon disulphide, chlorobenzene, cyclohexanol, cyclopentanol, decalin, dipropylene glycol, dodecyl benzene, fumaric acid diethylester, and nitroethane. In the foregoing list, the high surface tension liquid components with the exception of water have a surface tension within the range of from 30 to 50 mN/m.

The low surface tension liquid component may be one or more selected from the group comprising trifluoroethanol diethyl ether, dimethoxymethane, silicon tetrachloride, butylchloride and its isomers, propanol and its isomers, ethanol, methanol, butanol and its isomers, pentanol and its isomers, acetone, ethyl acetate, methyl isobutyl ketone, propyl acetate, methyl ethyl ketone, methyl methacrylate, methyl acetate, acetone, methyl chloroform, ethanal, propanal, butanal, methylamine, ethylamine, propylamine, butylamine, and pentylamine. The low surface tension liquid components in the foregoing list have surface tensions in the range of from 10 to 25 mN/m.

Thus, the high surface tension liquid composition may comprise water and ethanol in which the liquid composition has a surface tension in the range of from greater than 25 to 70 mN/m. Exemplary high surface tension liquid compositions include from about 1 to about 65 wt. % ethanol in water.

The coating material may be an ion exchange material (IEM), such as tetrafluoroethylene based polymer comprising sulfonated perfluorovinylether groups. Suitable ion exchange materials are described in more detail below.

A low surface tension fluid as a vapour (used herein synonymously with low surface tension fluid vapour) is used to treat the low surface energy substrate and/or the high surface tension liquid.

As used herein, the term "treating at least one of the low surface energy substrate and the high surface tension liquid with the low surface tension fluid as a vapour" is intended to mean the low surface tension fluid as a vapour being brought into contact with one or both of the low surface energy substrate and the high surface tension liquid so that they are touching. For instance, the treatment of the low surface energy substrate with the low surface tension fluid vapour can lead to the condensation of the low surface tension fluid onto the low surface energy substrate. This condensation may include adsorption and/or absorption processes. In one embodiment, a monolayer of the condensed low surface tension fluid is formed on the low surface energy substrate, particularly on the surface and in any pores of the substrate.

Similarly, the contacting of the high surface tension liquid with the low surface tension fluid vapour may include the adsorption and/or absorption of the low surface tension fluid at least onto the high surface tension liquid-atmosphere interface, thereby lowering the surface tension of the high surface tension liquid at the interface. However, the introduction of the low surface tension fluid into the bulk of the high surface tension liquid is not excluded, although it is not necessary to achieve a reduction in the surface tension of the high surface tension liquid.

Although the low surface tension fluid vapour may condense to a liquid during contacting, it is never present in the solid phase, and is subsequently removed from the low surface energy substrate. In one embodiment, the low surface tension fluid is substantially removed from the low surface energy substrate after the completion of both contacting steps. In another embodiment, the low surface tension fluid is completely removed from the low surface energy substrate after the completion of both contacting steps.

Without wishing to be bound by theory, the low surface tension fluid can alter one or both of the surface energy of the low surface energy substrate and the surface tension of the high surface tension liquid. For instance, contacting of the low surface energy substrate with the low surface tension fluid vapour may contact the surface of the low surface energy substrate with the low surface tension fluid as a liquid, increasing its surface energy of the substrate. Contacting of the high surface tension liquid with the low surface tension fluid vapour may introduce low surface tension fluid into the interface of the high surface tension liquid with the atmosphere, reducing the surface tension of the high surface tension liquid. Such an increase in the surface energy of the contacted low surface energy substrate and/or a decrease in the surface tension of the contacted high surface tension liquid can improve the wetting of the substrate by the liquid.

As used herein, the term "contacted low surface energy substrate" denotes a low surface energy substrate which has been contacted with low surface tension fluid vapour. Such a contacted low surface energy substrate may comprise low surface tension fluid liquid formed from the condensation of the low surface tension fluid vapour on the substrate. The low surface tension fluid liquid may be present on the surface of the low surface energy substrate. If the low surface energy substrate is a porous material, the low surface tension fluid liquid may be present in the pores of the substrate.

As used herein, the term "contacted high surface tension liquid" denotes a high surface tension liquid which has been contacted with low surface tension fluid vapour. Such a contacted high surface tension liquid may be a mixture and comprise one or more low surface tension liquid. The low surface tension fluid liquid may be present at the interface of the high surface tension liquid and the atmosphere.

Low Surface Tension Fluid

As used herein, the term "low surface tension fluid" refers to a fluid, which when in liquid form, has a surface tension in a range of from 10 to 25 mN/m. Preferably the low surface tension fluid, when in liquid form, has a surface tension in a range of from 10 to 20 mN/m, more preferably in a range from 15 to 20 mN/m. Alternatively, the low surface tension fluid, when in liquid form, preferably has a surface tension in a range of from 15 to 25 mN/m, more preferably in a range from 20 to 25 mN/m. As described in the experimental section below, the surface tension of the low surface tension fluid, when in liquid form, may be measured according to ASTM D1331-14.

The contacting is carried out with low surface tension fluid as a vapour. As used herein, the term "vapour" is intended to include a molecular gas or a molecular mixture of a gas and liquid. For instance, an aerosol is a partially condensed gas comprising liquid droplets and therefore falls within the meaning of the term vapour used herein.

The low surface tension fluid, such as the low surface tension fluid as a vapour, may be preferably selected from one or more of the compounds selected from aldehydes, alcohols, amines, ketones, ethers, cyclic ethers, esters, and organohalides, with the proviso that said compounds have a surface tension in a range of from 10 to 25 mN/m.

The low surface tension fluid, such as the low surface tension fluid as a vapour, may be one or more selected from the group comprising trifluoroethanol, diethyl ether, dimethoxymethane, silicon tetrachloride, butylchloride and its isomers, propanol and its isomers, ethanol, methanol, butanol and its isomers, pentanol and its isomers, acetone, ethyl acetate, methyl isobutyl ketone, propyl acetate, methyl ethyl ketone, methyl methacrylate, methyl acetate, acetone, methyl chloroform, ethanal, propanal, butanal, methylamine, ethylamine, propylamine, butylamine, and pentylamine.

The low surface tension fluid, such as the low surface tension fluid as a vapour, may be more preferably selected from one or more of the group comprising, 2,2,2-trifluoroethanol, 1-butanol, ethyl acetate, and diethyl ether. Such preferred low surface tension fluids, when in liquid form, have a surface tension in the range of from 10 to 25 mN/m.

The low surface tension fluid, such as the low surface tension fluid vapour, may be 2,2,2-trifluoroethanol, which has a surface tension of about 17 mN/m.

After both contacting steps, the low surface tension fluid, such as a low surface tension fluid, which may be present as a vapour or a liquid, is removed from the low surface energy substrate. This removal of the low surface tension fluid may be active or passive.

The step of removing the low surface tension fluid, such as a low surface tension fluid vapour or liquid, from the low surface energy substrate may be passive. For instance, the low surface tension fluid, when present as a liquid on the low surface energy substrate or on the surface of the high surface tension liquid, may evaporate under ambient temperature and pressure. Typically, the low surface tension fluid may have a sufficiently high vapour pressure to allow passive removal.

Alternatively, the step of removing the low surface tension fluid, such as the low surface tension fluid vapour or liquid, from the low surface energy substrate may be active.

The step of removing the low surface tension fluid, such as the low surface tension fluid vapour or liquid, from the low energy substrate may occur without the removal of the high surface tension liquid, for instance by fractional distillation by one or both of selectively reducing the pressure and increasing the temperature. This allows the low surface tension fluid to be separated from the high surface tension liquid, such that it can be recycled and reused, for instance in the method herein.

For instance, the low surface tension fluid and the high surface tension liquid may be removed sequentially, with the low surface tension fluid being removed first and the high surface tension liquid being removed subsequently. This can be achieved by one of both of reducing the pressure and increasing the temperature to a sufficient extent to cause the low surface tension fluid, the more volatile of the two compounds, to concentrate to a greater degree in the vapour, leaving the high surface tension liquid in the liquid state. Subsequently, one or both of the pressure may be further reduced and the temperature may be further increased to evaporate the high surface tension liquid. After separation of the high surface tension liquid (as a vapour) from the low surface energy substrate, the vapour may be condensed to provide the high surface tension liquid. This allows both the low surface tension fluid and the high surface tension liquid to be separated from one-another so that each may be recycled and reused in the method disclosed herein.

Alternatively, the step of removing the low surface tension fluid, such as the low surface tension fluid vapour or liquid, from the low surface energy substrate may further comprise the removal of the high surface tension liquid i.e. removing the low surface tension fluid (as a vapour or liquid) and the high surface tension liquid. Typically, the high surface tension liquid may be removed from the low surface energy substrate at the same time as the removal of the low surface tension fluid (as a vapour or liquid). For example, at least a portion of the low surface tension fluid may be present in the high surface tension liquid.

The step of removing the low surface tension fluid liquid, optionally together with the high surface tension liquid, from the low surface energy substrate may comprise one or both of evaporation and mechanical separation of the low surface tension fluid from the low surface energy substrate.

The evaporation of the low surface tension fluid, optionally together with the high surface tension liquid, from the low surface energy substrate may be achieved by one or both of increasing the temperature and reducing the pressure, such as reducing the pressure at or around the surface of the low surface energy substrate to cause the evaporation of the low surface tension fluid, optionally together with the high surface tension liquid. The temperature may be increased by any suitable means for heating, such as an oven, hot air blower, IR lamp and the like.

The mechanical separation of the low surface tension fluid, optionally together with the high surface tension liquid, may be achieved by pressing, wiping or absorption. For instance, the low surface tension fluid, which may be condensed or part of the high surface tension liquid (optionally together with the high surface tension liquid), may be wiped from the surface of the low surface energy substrate, or absorbed from the surface of low surface energy substrate onto an absorbent material, or the low surface energy substrate, such as a membrane, may be compressed.

The absorbent material carrying the absorbed low surface tension fluid, optionally together with the high surface tension liquid, may then be separated from the low surface energy substrate. In a further optional step, the low surface tension fluid, optionally together with the high surface tension liquid, may be released from the absorbent material, such as by one or more of heating, reducing the pressure and compressing the absorbent material.

The removing of the low surface tension fluid from the low surface energy substrate may be followed by the step of recycling the low surface tension fluid, so that it can be re-used, for instance in a continuous or batch-wise method. When the low surface tension fluid is present with the high surface tension liquid, the step of recycling the low surface tension fluid may comprise separating the low surface tension fluid from the high surface tension liquid.

For instance, when the low surface tension fluid and high surface tension liquid are present in the liquid phase, for instance after condensation from the gaseous phase or if it is removed as part of the high surface tension liquid, they may be separated by fractional distillation to provide low surface tension fluid vapour.

Alternatively, if the low surface tension fluid and the high surface tension liquid are removed from the low surface energy substrate by evaporation, the high surface tension liquid may be selectively condensed by cooling it below its liquefaction temperature, while maintaining the low surface tension fluid as a vapour.

Coating

Coating materials are often deposited on a substrate from a liquid carrier, either as dispersions or suspensions of solid coating material in the liquid carrier, or as a solution if the coating material is soluble in the liquid carrier. Compatibility between the coating material and the liquid carrier is therefore important. For instance, polar liquid carriers like water may have a high surface tension, for example due to hydrogen bonding between the liquid molecules. As already discussed, such high surface tension liquids may poorly wet low surface energy substrates, such that the deposition of the carrier material from the high surface tension liquid onto the low surface energy substrate may provide a non-uniform distribution of the coating material on the substrate upon removal of the high surface tension liquid or may fail to reach pores within the surface of the substrate. The wetting method and system described herein can be used to deposit a coating material carried in the high surface tension liquid onto the low surface energy substrate, and particularly improve the deposition of such a coating material, in terms of the distribution of the coating material, and the distribution of the coating material into any pores in the surface of the substrate.

The method disclosed herein can be used to apply a coating material on the low surface energy substrate when the high surface tension liquid comprises a coating material. In this way, the contacting provides a low surface energy substrate coated with the high surface tension liquid comprising the coating material.

Such a method may further comprise the step of removing the high surface tension liquid from the low surface energy substrate to provide a low surface energy substrate coated with the coating material.

As used herein, the terms "coating" or "coated" are intended to denote a covering applied to a substrate. The covering includes the surface of the substrate and may extend into the interior of the substrate through surface openings such as pores. The coating may cover an entire surface of the substrate or may only cover parts of the substrate including only parts of the surface and openings into the interior of the substrate such as pores.

The coating material may be one or more compounds selected from the group comprising an ion exchange material (IEM), such as those described above, particularly tetrafluoroethylene based polymer comprising sulfonated perfluorovinylether groups. Suitable ion exchange materials include, for example, perfluorosulfonic acid polymers, perfluorocarboxylic acid polymers, perfluorophosphonic acid polymers, styrenic ion exchange polymers, fluorostyrenic ion exchange polymers, sulfonated polyether ether ketone ion exchange polymers, polyarylether ketone ion exchange polymers, polysulfone ion exchange polymers, bis(fluoroalkylsulfonyl)imides, (fluoroalkylsulfonyl)(fluorosulfonyl) imides, polyvinyl alcohol, polyethylene oxides, metal salts with or without a polymer, and mixtures thereof. In exemplary embodiments, the ion exchange material comprises perfluorosulfonic acid (PFSA) polymers made by copolymerization of tetrafluoroethylene and perfluorosulfonyl vinyl ester with conversion into proton form. Examples of suitable perfluorosulfonic acid polymers for use in fuel cell applications include Nafion® (E.I. DuPont de Nemours, Inc., Wilmington, Del., US), Flemion® (Asahi Glass Co. Ltd., Tokyo, JP), Aciplex® (Asahi Kasei Corporation, Tokyo, JP), Aquivion® (SolvaySolexis S.P.A, Italy), and 3MTM (3M Innovative Properties Company, USA) which are commercially available perfluorosulfonic acid copolymers. Other examples of suitable perfluorosulfonic acid polymers for use in fuel cell applications include perfluorinated sulfonyl (co)polymers such as those described in U.S. Pat. No. 5,463,005.

Typically, the low surface energy substrate may be a porous ePTFE membrane for a fuel cell.

Preferably, the coating material is an ion exchange material, such as tetrafluoroethylene based polymer comprising sulfonated perfluorovinylether groups. Porous ePTFE membranes impregnated with tetrafluoroethylene based polymer comprising perfluorovinylether groups are desirable membrane materials for proton-exchange membrane fuel cells.

Figure 2:
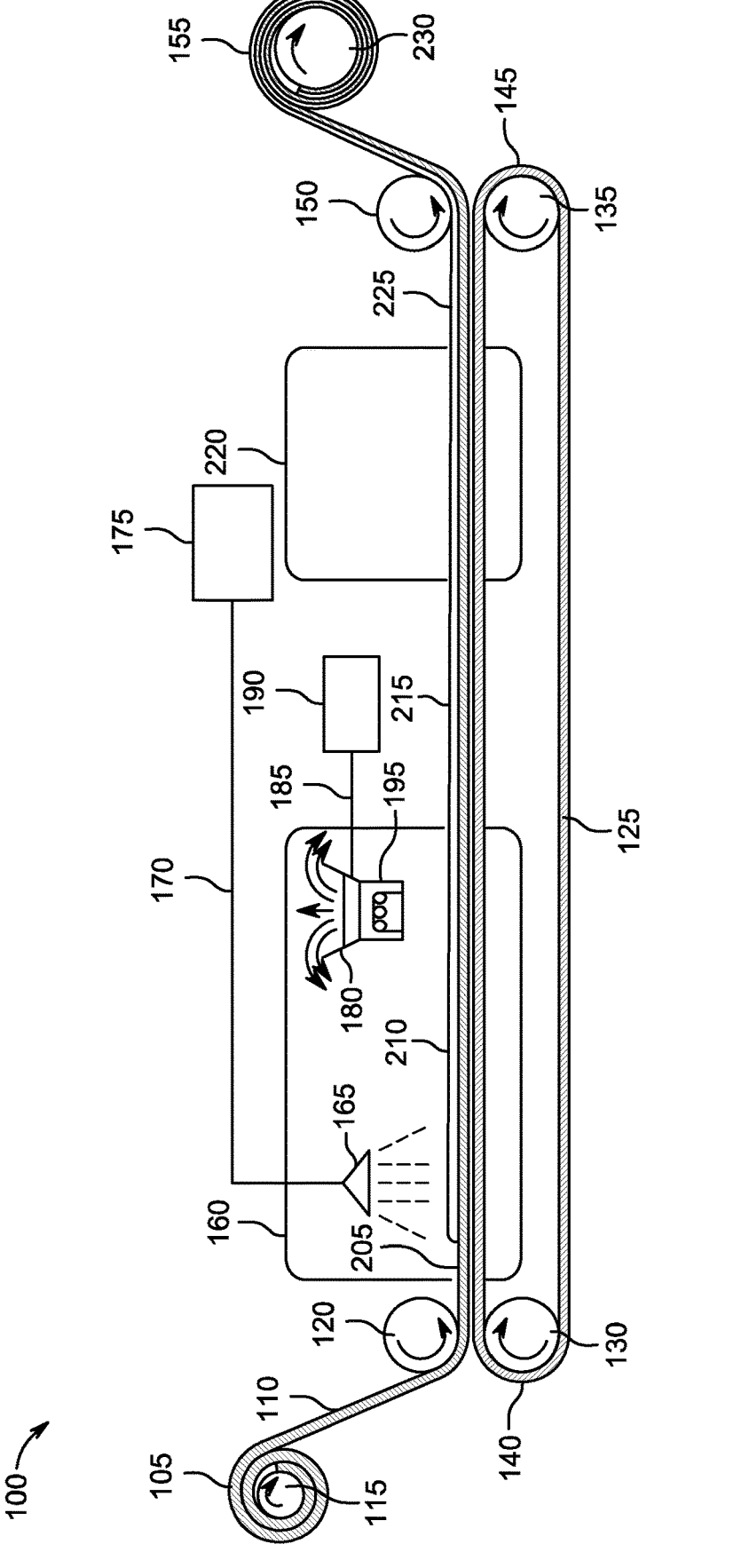
FIG. 2 shows a schematic representation of a system which can be used in the method described herein.

FIG. 2 shows a schematic representation of a system 100 and method for wetting a low surface energy substrate 110 with a high surface tension liquid. A continuous processing method is shown, of the roll-to-roll type, although other continuous methods or discontinuous methods such as batch-wise processes could also be used.

A low surface energy substrate 110, such as a porous fluoropolymer, for instance ePTFE can be provided on a substrate supply roll 105.

An ePTFE substrate, such as a membrane or film, may be produced by a process taught in U.S. Patent No. 8,757,395 to Gore. The porous ePTFE formed by the process has a microstructure of nodes interconnected by fibrils, demonstrates higher strength than unexpanded PTFE, and retains the chemical inertness and wide useful temperature range of unexpanded PTFE. It is therefore useful as the basis for a membrane material for proton exchange membrane fuel cells.

The substrate supply roll 105 can be mounted on a substrate supply rotating element 115, which may be driven by a motor or may be freely rotatable. The low surface energy substrate 110, for instance ePTFE, can be released from the substrate supply roll 105 by first substrate rotating element 120 which induces unwinding of the substrate from the supply roll 105 in a circular motion and guides the low surface energy substrate 110 onto a rotatable elastic carrier belt 125. The rotatable elastic carrier belt 125 supports the low surface energy substrate 110 during processing. The rotatable elastic carrier belt 125 has a first end 140 at which the low surface energy substrate 110 is supplied and a second end 145 at which the low surface energy substrate coated with the coating material 225 is removed.

A second substrate rotating element 150 at the second end 145 of the rotatable elastic carrier belt 125 guides the low surface energy substrate coated with the coating material to a coated substrate product roll 155 comprising the low surface energy substrate coated with the coating material. The first and second substrate rotating elements 120, 150 together keep the low surface energy substrate in a flat state during processing. This can be achieved by maintaining the low surface energy substrate under low tension, for instance below 50 N/m.

The rotatable elastic carrier belt 125 may be a loop of elastic carrier belt, rotated by first and second carrier rotating elements 130, 135. The first and second carrier rotating elements 130, 135, together with the first and second substrate rotating elements 120, 150 may be independently or synchronously driven by one or more motors, such as electric motors.

The low surface energy substrate 110 may be drawn into a contacting chamber 160 by the elastic carrier belt 125. The contacting chamber 160 comprises a high surface tension liquid applicator 165 and a low surface tension fluid vapour applicator 180.

The high surface tension liquid applicator 165 can be any suitable means for applying the high surface tension liquid to the low surface energy substrate, and particularly a surface thereof. FIG. 2 shows a spray head as the high surface tension liquid applicator 165. The spray head is in fluid communication with a high surface tension liquid tank 175 via a high surface tension liquid supply line 170. Sufficient pressure to force the high surface tension liquid through the spray head can be provided by a high surface tension liquid pump (not shown), or by situating the high surface tension liquid tank 175 gravitationally above the spray head. The high surface tension liquid pump can meter the correct dosage of high surface tension liquid onto the low surface energy substrate 110 which is drawn beneath the spray head. In this way, a surface of the low surface energy substrate 110 is contacted with the high surface tension liquid 210. The high surface tension liquid may be, for instance a water/ethanol mixture, such as highly aqueous mixture comprising from 1 to 65 wt. % ethanol.

When a coating material is to be applied to the low surface energy substrate 110, the coating material is present in the high surface tension liquid. For instance, the coating material may be added to the high surface tension liquid tank 175 in an appropriate quantity. The coating material may be an ion exchange material, such as tetrafluoroethylene based polymer comprising sulfonated perfluorovinylether groups.

Although an ePTFE substrate is porous, it has a low surface energy of about 19-20 mN/m. Liquids with high surface tensions cannot pass through the pores of an ePTFE substrate. Water has a surface tension of about 72 mN/m, such that it cannot enter the pores of the ePTFE substrate.

Similarly, water/ethanol mixtures having 65 wt. % or less ethanol, which have a surface tension of over 25 mN/m, also exhibit insufficient wetting of ePTFE substrates. Thus, when water or water/ethanol mixtures are used as a liquid carrier for a coating material for ePTFE, the coating material carried in water will not enter the pores and/or sufficiently wet the substrate and/or will wet the substrate unacceptably slowly.

In order to improve the wetting of the low surface energy substrate 110 contacted with the high surface tension liquid 210, and particularly to enable the high surface tension liquid to penetrate the pores of the substrate, one or both of the substrate and liquid can be contacted with a low surface tension fluid vapour.

The low surface tension fluid vapour is supplied by a low surface tension fluid vapour applicator, which can be any means suitable to apply the low surface tension fluid as a vapour to one or both of the low surface energy substrate 110 and the high surface tension liquid. FIG. 2 shows an evaporator as the low surface tension fluid vapour applicator 180. The evaporator is in fluid communication with a low surface tension fluid tank 190 via a low surface tension fluid supply line 185. The low surface tension fluid may be stored in the low surface tension fluid supply tank 185 as a liquid and transferred to the evaporator along low surface tension fluid supply line 185 as a liquid. A low surface tension fluid pump (not shown) may be provided to pass the low surface tension fluid in the liquid phase from the supply tank to the evaporator. The evaporator is fitted with a heating element 195 to heat and vaporise the low surface tension fluid which is supplied as a liquid. In this way, the atmosphere in contacting chamber 160 comprises low surface tension fluid vapour. In some embodiments, the atmosphere in the contacting chamber 160 can be saturated with the low surface tension fluid vapour. The low surface tension fluid may be, for instance, 2,2,2-trifluoroethanol, ethyl acetate, diethyl ether or 1-butanol. The 2,2,2-trifluoroethanol has a boiling point of 74° C., and a surface tension of about 16.5 mN/m and so is ideal as a low surface tension fluid.

The low surface energy substrate 110 and high surface tension liquid 210 are exposed to the low surface tension fluid vapour in the contacting chamber 160.

The low surface tension fluid vapour can contact portion 205 of the low surface energy substrate which lies upstream of the high surface tension liquid applicator 165 in the contacting chamber 160 and has not therefore been contacted with high surface tension liquid 210. The low surface tension fluid vapour in the contacting chamber can condense on the surface of the portion 205 of the low surface energy substrate to provide a contacted low surface energy substrate comprising condensed low surface tension fluid. The contacting of the low surface energy substrate with the low surface tension fluid can increase the surface energy of the substrate and/or lower the interface energy, improving the subsequent wetting of the substrate with the high surface tension liquid.

The low surface tension fluid vapour can also contact the high surface tension liquid 210. The low surface tension fluid vapour in the contacting chamber 160 can be absorbed and/or adsorbed by the high surface tension liquid at the liquid-atmosphere interface, either as a droplet of high surface tension liquid as it leaves the spray head, or after it has contacted the low surface energy substrate 110. Without wishing to be bound by theory, the contacting of the high surface tension liquid with the low surface tension fluid lowers the surface tension of the high surface tension liquid, improving the wetting of the low surface energy substrate 110 with the contacted high surface tension liquid.

Thus, the contacting chamber 160 provides a contacted low surface energy substrate wetted with the contacted high surface tension liquid 215. The contacted low surface energy substrate wetted with the contacted high surface tension liquid 215 can then be passed to a separation chamber 220. The separation chamber 160 comprises a separator to remove the low surface tension fluid, preferably together with the high surface tension liquid and from the wetted low surface tension substrate. Typically, the separation chamber 160 is held at increased temperature and/or reduced pressure (compared to ambient) in order to vaporise the high surface tension liquid and low surface tension fluid. The separator is preferably an IR lamp.

The separation chamber 160 may further comprise means for removing vaporised high surface tension liquid and low surface tension fluid from the chamber, such as an outlet connected to a pump (not shown). The vaporised high surface tension liquid and low surface tension fluid vapour may then be recycled (not shown). For instance, the vaporised high surface tension liquid may be preferentially condensed to separate it from the low surface tension fluid vapour and passed to high surface tension liquid tank 175. The remaining low surface tension fluid vapour may then be condensed and passed to the low surface tension fluid tank 190 as a liquid.

Returning to FIG. 2, if the high surface tension liquid comprises a coating material, then the separation chamber will remove the high surface tension liquid and low surface tension fluid to provide a low surface energy substrate coated with the coating material 225. If the low surface energy substrate is porous, such as ePTFE, the coating material typically impregnates the pores of the substrate.

The low surface energy substrate coated with the coating material 225 can then be removed from the rotatable elastic carrier belt 125 by second substrate rotating element 150 and passed to a coated substrate rotating element 230 where it can be wound to provide a coated substrate product roll 155.

Figure 3:
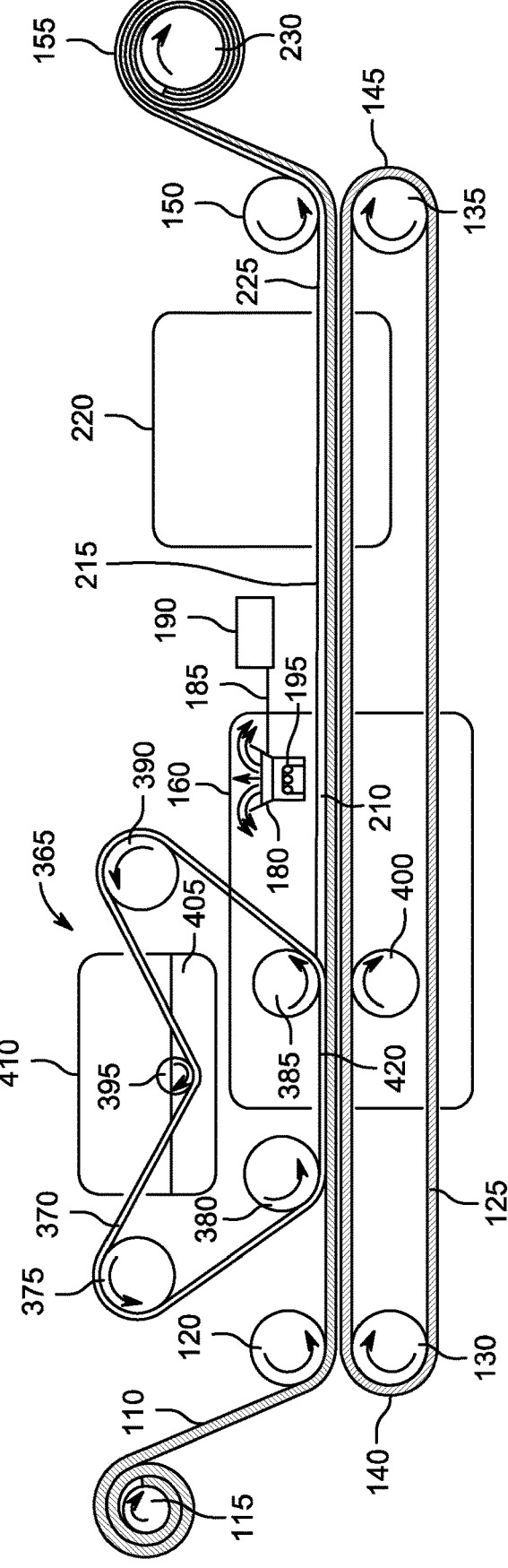
FIG. 3 shows a schematic representation of another system which can be used in the method described herein.

FIG. 3 shows a schematic representation of an alternative system 300 for use with the method disclosed herein. Those features of FIG. 3 which are equivalent to or the same as those of FIG. 2 have been assigned identical reference numerals.

The system of FIG. 3 differs from that of FIG. 2 in terms of the high surface tension liquid applicator 365. Rather than a spray head, the high surface tension liquid applicator 365 comprises a release liner 370 comprising a high surface tension liquid, first, second and third release liner rotating elements 375, 390 and 395 to guide the release liner 370, and a contactor to contact the low surface energy substrate 110 with the release liner comprising the high surface tension liquid 370. The contactor may comprise first and second contactor rotating elements 380, 385.

The release line may be configured as a loop. The third release liner rotating element 395 immerses the release liner 370 in high surface tension liquid 405 stored in high surface tension liquid tank 410. The high surface tension liquid may be a water/ethanol mixture, such as an aqueous mixture comprising from 1 to 65 wt. % ethanol. Preferably the high surface tension liquid comprises a coating material, such as an ion exchange material like a tetrafluoroethylene based polymer comprising sulfonated perfluorovinylether groups.

The release liner may be an absorbent material, such as a porous woven and non-woven web. When immersed in the high surface tension liquid 405, the release liner 370 absorbs the high surface tension liquid and any coating material carried therein. The release liner comprising the high surface tension liquid is then guided to the low surface energy substrate by the first release liner rotating element 370. First and second contacting rotating elements 380, 385 then contact the release liner comprising the high surface tension liquid to the low surface energy substrate 110.

The low surface energy substrate 110 contacted with the release liner comprising the high surface tension liquid 370 and any coating material is then passed to contacting chamber 160. Contacting chamber 160 comprises a similar low surface tension fluid vapour applicator 180 to that described in the embodiment of FIG. 2. The low surface tension fluid vapour applicator 180 comprises an evaporator for the low surface tension in the liquid phase, in order to provide an atmosphere comprising low surface tension fluid vapour in the contacting chamber 160. The low surface tension fluid may be, for instance, 2,2,2-trifluoroethanol, ethyl acetate, diethyl ether or 1-butanol.

Thus, the portion 420 of the release liner comprising the high surface tension liquid and any coating material which lies within the contacting chamber 160 is exposed to the low surface tension fluid vapour. The low surface tension fluid thus contacts the high surface tension liquid held on the release liner which is contacting the low surface energy substrate 110 within the contacting chamber 160. The low surface tension fluid vapour may absorb and/or adsorb onto the interface between the high surface tension liquid and the atmosphere. The low surface tension fluid may then diffuse to or near the high surface tension liquid-low surface energy substrate interface to lower the surface tension of the high surface tension liquid, thereby increasing contact and wetting between the liquid and the substrate.

Second contacting rotating element 385 can be used in combination with a compressing rotating element 400 to release the contacted high surface tension liquid from the release liner onto the low surface energy substrate 110. The release liner comprising the contacted high surface tension liquid can be fed between the second contacting rotating element 385 and compressing rotating element 400 to be compressed to force out the contacted high surface tension liquid. Thus, the second contacting rotating element 385 and the compressing rotating element 400 can compress the rotatable elastic carrier belt 125, low surface energy substrate 110 and release liner comprising the high surface tension liquid to separate the high surface tension liquid from the release liner and pass the separated high surface tension liquid 210 to the low surface energy substrate. Compression between the second contacting rotating element 385 and the com pressing rotating element 400 squeezes the release liner comprising the high surface tension liquid to release the high surface tension liquid contacted with the low surface tension fluid 210.

The high surface tension liquid 210 released from release liner 370 and contacting the low surface energy substrate 110 is also exposed to the low surface tension fluid vapour in the contacting chamber 160. The low surface tension fluid vapour thus contacts the high surface tension liquid 210 released from the release liner.

The low surface tension fluid vapour in the contacting chamber 160 can be absorbed and/or adsorbed by the high surface tension liquid at the liquid-atmosphere interface as already discussed.

The high surface tension liquid contacted with the low surface tension fluid wets the low surface energy substrate 110. Thus, the contacting chamber 160 provides a low surface energy substrate wetted with the high surface tension liquid 215.

In an alternative embodiment not shown in FIG. 3, the first and second contacting rotating elements 380, 385 may both be situated inside the contacting chamber. In such an embodiment, a portion of the low surface energy substrate can be exposed to the low surface tension fluid vapour before it is contacted with the high surface tension liquid on the release liner. In this way, the low surface energy substrate can be contacted with the low surface tension fluid vapour before the contacting with the release liner and subsequent contacting of the high surface tension liquid with the low surface tension fluid vapour.

Other aspects and embodiments of the invention provide the aspects and embodiments described above with the term "comprising" replaced by the term "consisting of" and the aspects and embodiments described above with the term "comprising" replaced by the term "consisting essentially of".

It is to be understood that the application discloses all combinations of any of the above aspects and embodiments described above with each other, unless the context demands otherwise. Similarly, the application discloses all combinations of the preferred and/or optional features either singly or together with any of the other aspects, unless the context demands otherwise.

All documents mentioned in this specification are incorporated herein by reference in their entirety for all purposes.

The term "and/or" where used herein is to be taken as specific disclosure of each of the two specified features or components with or without the other. For example, "A and/or B" or "one or both of A and B" is to be taken as specific disclosure of each of (i) A, (ii) B and (iii) A and B, just as if each is set out individually herein.

Certain aspects and embodiments of the invention will now be illustrated by way of example.

Test Procedures and Measurement Protocols used in Examples Bubble Point

The Bubble Point was measured according to the procedures of ASTM F316-86. Isopropyl alcohol was used as the wetting fluid to fill the pores of the test specimen. The Bubble Point is the pressure of air required to create the first continuous stream of bubbles detectable by their rise through the layer of isopropyl alcohol covering the microporous polymer matrix. This measurement provides an estimation of maximum pore size.

Gurley Number

Gas flow barrier properties were measured using Gurley Densometer according to ASTM D-726-58. The procedure includes clamping sample between air permeable plates of the Gurley Densometer. An inner cylinder of known weight that can slide freely is then released. The Gurley number is defined as time in seconds it takes for the released inner cylinder to displace a certain volume of air in the Densometer through the sample material.

Gas Permeability (ATEQ)

An ATEQ Corp. Premier D Compact Flow Tester was used to measure the flowrate of air (in litres/hour) through each microporous polymer structure when challenged with a differential pressure of 1.2 kPa (12 mbar). The samples were clamped between two plates in a manner that defined a cross sectional area of 2.9 cm$^2$ for the flow path.

Non-Contact Thickness

A sample of microporous polymer structure was placed over a flat smooth metal anvil and tensioned to remove wrinkles. Height of microporous polymer structure on anvil was measured and recorded using a non-contact Keyence LS-7010M digital micrometer. Next, height of the anvil without microporous polymer matrix was recorded. Thickness of the microporous polymer structure was taken as a difference between micrometer readings with and without microporous structure being present on the anvil.

Mass-Per-Area

Each Microporous Polymer structure was strained sufficient to eliminate wrinkles, and then a 10 cm$^2$ piece was cut out using a die. The 10 cm$^2$ piece was weighed on a conventional laboratory scale. The mass-per-area (M/A) was then calculated as the ratio of the measured mass to the known area. This procedure was repeated 2 times and the average value of the M/A was calculated.

Apparent Density of Microporous Layer

Apparent density of microporous polymer structure was calculated using the non-contact thickness and mass-per-area data using the following formula:

$$\text{Apparent } density_{microporous\ layer} = \frac{\{M/A_{microporous\ layer}\}}{\{non-contact\ thickness\}} = [g/cc]$$

Solids Concentration of Solutions of Ion Exchange Material (IEM)

Herein, the terms "solution" and "dispersion" are used interchangeably when referring to IEMs. This test procedure is appropriate for solutions in which the IEM is in proton form, and in which there are negligible quantities of other solids. A volume of 2 cubic centimeters of IEM solution was drawn into a syringe and the mass of the syringe with solution was measured via a balance in a solids analyser (obtained from CEM Corporation, USA). The mass of two pieces of glass fibre paper (obtained from CEM Corporation, USA) was also measured and recorded. The IEM solution was then deposited from the syringe into the two layers of glass fibre paper. The glass fibre paper with the ionomer solution was placed into the solids analyser and heated up to 160° C. to remove the solvent liquids. Once the mass of the glass fibre paper and residual solids stopped changing with respect to increasing temperature and time, it was recorded. It is assumed that the residual IEM contained no water (i.e., it is the ionomer mass corresponding to 0% RH). After that, the mass of the emptied syringe was measured and recorded using the same balance as before. The ionomer solids in solution was calculated according to the following formula:

$$\{wt\ \%\ solids\ of\ IEM\ solution\} =$$

$$\frac{\{\text{Mass of glass fiber paper with residual solids}\} - \{\text{Mass of fiber paper}\}}{\{\text{Mass of full syringe}\} - \{\text{Mass of emptied syringe}\}}$$

$$= [wt\ \%]$$

Equivalent Weight (EW) of an IEM

The following test procedure is appropriate for IEM comprised of a single ionomer resin or a mixture of ionomer resins that is in the proton form (i.e., that contains negligible amounts of other cations), and that is in a solution that contains negligible other ionic species, including protic acids and dissociating salts. If these conditions are not met, then prior to testing the solution must be purified from ionic impurities according to a suitable procedure as would be known to one of ordinary skill in the art, or the impurities must be characterized and their influence on the result of the EW test must be corrected for.

As used herein, the EW of an IEM refers to the case when the IEM is in its proton form at 0% RH with negligible impurities. The IEM may comprise a single ionomer or a mixture of ionomers in the proton form. An amount of IEM solution with solids concentration determined as described above containing 0.2 grams of solids was poured into a plastic cup. The mass of the ionomer solution was measured via a conventional laboratory scale (obtained from Mettler Toledo, LLC, USA). Then, 5 ml of deionized water and 5 ml of 200 proof denatured ethanol (SDA 3C, Sigma Aldrich, USA) is added to ionomer solution in the cup. Then, 55 ml of 2 N sodium chloride solution in water was added to the IEM solution. The sample was then allowed to equilibrate under constant stirring for 15 minutes. After the equilibration step, the sample was titrated with 1 N sodium hydroxide solution. The volume of 1 N sodium hydroxide solution that was needed to neutralize the sample solution to a pH value of 7 was recorded. The EW of the IEM (EW$_{IEM}$) was calculated as:

$$EW_{IEM} = \frac{\{\text{Mass of } IEM\ \text{solution}\} \times \{wt\ \%\ \text{solids } IEM\ \text{solution}\}}{\{\text{Volume of NaOH solution}\} \times \{\text{Normality of NaOH solution}\}} =$$

$$\left[\frac{g}{mole\ eq.}\right]$$

When multiple IEMs were combined to make a composite membrane, the average EW of the IEMs in the composite membrane was calculated using the following formula:

$$EW_{IEM\_average} = \left[ \frac{\{Mass\ fraction\ of\ IEM1\}}{\{EW_{IEM,1}\}} + \frac{\{Mass\ fraction\ of\ IEM2\}}{\{EW_{IEM,2}\}} + \cdots \cdot \frac{\{Mass\ fraction\ of\ IEMN\}}{\{EW_{IEM,N}\}} \right]^{-1} = \left[ \frac{g}{mole\ eq.} \right],$$

where the mass fraction of each IEM is with respect to the total amount of all IEMs. This formula was used both for composite membranes containing ionomer blends and for composite membranes containing ionomer layers.

Surface Energy of Solids

Surface energy of solids can be measured according to ASTM D7490-13 at standard temperature of 25° C.

TABLE 1

| Characterisation of low surface energy porous membranes | | | | | | | | |
|---|---|---|---|---|---|---|---|---|
| Low surface energy substrate ID | Low surface energy support chemistry | Mass/area [g/m²] | Density [g/cc] | Non-contact Thickness [micron] | ATEQ gas perm. [L/Hr @12 mbar] | Gurley [s] | Bubble point [psi] | Surface energy [dyne/cm (μN/cm)] |
| 1 | PTFE | 27.80 | 0.20 | 137.08 | — | 26.25 | 43.50 | 19 (190) |
| 2 | PTFE | 17.50 | 0.52 | 33.38 | — | 12.13 | 23.70 | 19 (190) |
| 3 | PP | 17.00 | 0.15 | 110 | — | — | 15.00 | 30 (300) |
| 4 | PTFE | 4.69 | 0.34 | 13.95 | 32.10 | 6.75 | 47.10 | 19 (190) |
| 5 | PTFE | 1.89 | 0.27 | 7.15 | 26.50 | 7.75 | 137.60 | 19 (190) |
| 6 | PTFE | 3.13 | 0.33 | 9.40 | 36.85 | 5.95 | 56.80 | 19 (190) |
| 7 | PTFE | 0.60 | 0.17 | 3.55 | 89.55 | — | 74.95 | 19 (190) |

The porous membrane #3, porous polypropylene, stock keeping unit (sku) PP022005, was purchased from Sterlitech Corporation, USA.

Surface Tension of Liquids

Surface tension of liquids can be measured according to ASTM D1331-14 at standard temperature of 25° C.

TABLE 2

| Characterisation of surface tension of selected fluids | |
|---|---|
| Name | Surface tension, [dyne/cm (μN/cm)] |
| High surface tension liquid | |
| Water | 72 (720) |
| IW100-800 12% in 70 wt. %/30 wt. % Water/Ethanol | 32 (320) |
| 90 wt. %/10 wt. % Water/Ethanol | 48 (480) |
| Other liquid | |
| Acetonitrile | 29 (290) |
| Low surface tension fluid | |
| 2,2,2-trifluoroethanol | 17 (170) |
| 1-butanol | 25 (250) |
| Ethyl acetate | 24 (240) |
| Diethyl ether | 17 (170) |

Comparative Example 1

Comparative examples 1.1-1.7 were made according to the following procedure. Low surface tension membrane substrates 1-7 as defined in Table 1 above were hand strained to eliminate wrinkles. Next each membrane was wrapped over one side of a cylindrical PVC plastic frame of 2.5 cm inner diameter, 3.4 cm outer diameter and 0.5 cm height. Next, a rubber O-ring was placed over the porous membrane restrained over the plastic frame in order to secure the membrane to the frame. Next, 0.1 ml of de-ionized water having a surface tension of about 72 mN/m was applied onto a glass sheet in seven separate locations in a pattern of a circle with diameter of about 12 cm. The water coating was accomplished using a polypropylene pipet, delivering 0.1 mL of liquid as a droplet onto the glass sheet. While the coating was still wet, each of the low surface energy porous membranes previously restrained on the plastic frames were placed over the separate droplets of water to provide a laminate structures of water and membranes. Metal washers of 22.5 grams, having an inner diameter of 2 cm and an outer diameter of 4.5 cm were placed on top of the PVC frames to maintain the laminate structures. The laminates were covered with a glass beaker of 20 cm in diameter and 10 cm in height and left under ambient conditions (22° C., 40% relative humidity) inside. The glass beaker had a magnetic stir plate mounted to it on the top outer side and a magnetic stir bar on the inside top surface with aluminium foil wrapped around it to form a propeller. The stir plate was switched on to rotate the stir bar at 200 rpm. This construction allowed the circulation of the atmosphere inside of the glass beaker. After 60 minutes no signs of water liquid penetrating the porous low surface energy membrane substrates were observed, the porous membranes stayed opaque.

Comparative Example 2

Comparative examples 2.1-2.7 were made according to the following procedure. Low surface tension membrane substrates 1-7 as defined in Table 1 above were hand strained to eliminate wrinkles. Next each membrane was wrapped over one side of a cylindrical PVC plastic frame of 2.5 cm inner diameter, 3.4 cm outer diameter and 0.5 cm height. Next, a rubber O-ring was placed over the porous membrane restrained over the plastic frame in order to secure the membrane to the frame. Next, droplets of water-ethanol mixture with composition of 90% water by weight and 10% ethanol by weight having a surface tension of 48 mN/m were applied onto a glass sheet in seven separate locations in a pattern of a circle with diameter of about 12 cm. The liquid coating was accomplished using a polypropylene pipet, delivering 0.1 mL of liquid onto the glass sheet. While the coating was still wet, the low surface energy porous membranes previously restrained on the plastic frame were placed over the separate droplets of liquid to provide laminate structures of liquids and membranes. Metal washers of 22.5 grams, having an inner diameter of 2 cm and an outer diameter of 4.5 cm were placed on top of the PVC frames to maintain the laminate structures. The laminates were covered with glass beaker 20 cm in diameter and 10 cm in height and left under ambient conditions (22° C., 40% relative humidity) inside. The glass beaker had a magnetic stir plate mounted to it on the top outer side and a magnetic stir bar on the inside top surface with aluminium foil wrapped around it to form a propeller. The stir plate was switched on to rotate the stir bar at 200 rpm. This construction allowed the circulation of the atmosphere inside the glass container. After 60 minutes no signs of water-ethanol mixture penetrating the porous low surface energy membrane substrates were observed, the porous membranes stayed opaque.

Comparative Example 3

Comparative examples 3.1-3.7 were made according to the following procedure. Low surface tension membrane substrates 1-7 as defined in Table 1 above were hand strained to eliminate wrinkles. Next each membrane was wrapped over one side of a cylindrical PVC plastic frame of 2.5 cm inner diameter, 3.4 cm outer diameter and 0.5 cm height. Next, a rubber O-ring was placed over the porous membrane restrained over the plastic frame in order to secure the membrane to the frame. Next, droplets of IEM solution having surface tension of 32 mN/cm with ionomer having EW=810 g/mole eq. (obtained from Asahi Glass Company, product number IW100-800), comprising 61.6% water by weight, 26.4% ethanol by weight, 12% solids by weight, were applied onto a glass sheet in seven separate locations in a pattern of a circle with diameter of about 12 cm. The IEM coating was accomplished using a polypropylene pipet, delivering 0.1 mL of the IEM solution as a droplet onto the glass sheet. While the coating was still wet, the low surface energy porous membranes previously restrained on the plastic frames were placed over the separate droplets of IEM solution to provide laminate structures of solutions and membranes. Metal washers of 22.5 grams, having an inner diameter of 2 cm and an outer diameter of 4.5 cm were placed on top of the PVC frames with laminates to maintain the laminate structures. The laminates were covered with glass beaker 20 cm in diameter and 10 cm in height and left under ambient conditions (22° C., 40% relative humidity) inside. The glass beaker had a magnetic stir plate mounted to it on the top outer side and a magnetic stir bar on the inside top surface with aluminium foil wrapped around it to form a propeller. The stir plate was switched on to rotate the stir bar at 200 rpm. This construction allowed the circulation of the atmosphere inside the glass container. After 60 minutes no signs of IEM liquid penetrating the porous low surface energy membrane substrates were observed, the porous membranes stayed opaque.

Comparative Example 4

Comparative examples 4.1-4.7 were made according to the following procedure. Low surface tension membranes 1-7 as defined in Table 1 above were hand strained to eliminate wrinkles. Next each membrane was wrapped over one side of a cylindrical PVC plastic frame of 2.5 cm inner diameter, 3.4 cm outer diameter and 0.5 cm height. Next, a rubber O-ring was placed over the porous membrane restrained over the plastic frame in order to secure the membrane to the frame. Next, 0.1 ml of acetonitrile having a surface tension of 29 mN/m was applied onto a glass sheet in seven separate locations in a pattern of a circle with diameter of about 12 cm. The acetonitrile coating was accomplished using a polypropylene pipet, delivering 0.1 mL of solution as a droplet onto the glass sheet. While the coating was still wet, each the low surface energy porous membranes previously restrained on the plastic frames were placed over the separate droplets of acetonitrile to provide a laminate structure of acetonitrile and membrane. Metal washers of 22.5 grams, having an inner diameter of 2 cm and an outer diameter of 4.5 cm were placed on top of the PVC frames to maintain the laminate structures. The laminates were covered with glass beaker 20 cm in diameter and 10 cm in height and left under ambient conditions (22° C., 40% relative humidity) inside. The glass beaker had a magnetic stir plate mounted to it on the top outer side and a magnetic stir bar on the inside top surface with aluminium foil wrapped around it to form a propeller. The stir plate was switched on to rotate the stir bar at 200 rpm. This construction allowed for circulation of the atmosphere inside of the glass beaker. The acetonitrile spontaneously penetrated porous membrane #3 made of polypropylene as evidenced by visual clarification of the membrane because acetonitrile has a lower surface tension than the surface energy of porous membrane #3. The visual clarification of the membrane presented as a transition from an opaque, white coloured membrane to a semi-transparent wetted membrane. The acetonitrile did not penetrate the porous membranes #1,2, and 4-7 made of PTFE as was evidenced by lack of visual clarification of the membranes after 3600 seconds time, the porous membranes stayed opaque.

Example 1

Examples 1.1-1.7 were made according to the following procedure. Low surface tension membrane substrates 1-7 as defined in Table 1 above were hand strained to eliminate wrinkles. Next each membrane was wrapped over one side of a cylindrical PVC plastic frame of 2.5 cm inner diameter, 3.4 cm outer diameter and 0.5 cm height. Next, a rubber O-ring was placed over the porous membrane restrained over the plastic frame in order to secure the membrane to the frame. Next, 0.1 ml of a water-ethanol mixture with composition of 90% water by weight and 10% ethanol by weight was applied onto a glass sheet in seven separate locations in a pattern of a circle with diameter of about 12 cm. The water-ethanol coating was accomplished using a polypropylene pipet, delivering 0.1 mL of the liquid mixture as a droplet onto the glass sheet. While the coating was still wet, each of the low surface energy porous membranes previously restrained on the plastic frames were placed over the separate droplets of ethanol-water mixture to provide a laminate structure of mixture and membrane. Metal washers of 22.5 grams, having an inner diameter of 2 cm and an outer diameter of 4.5 cm were placed on top of the PVC frames to maintain the laminate structure. Next, a ceramic crucible at room temperature, of 5 cm height and 3 cm diameter at its top was placed in the centre of the circle defined by the laminates. A laboratory tissue paper (Kimwipes, Kimberly Clark) was crumpled by hand and placed into the crucible. Next, a 1 ml sample of 2,2,2-trifluoroethanol was delivered to the wipe via a graduated syringe. The laminates and crucible were covered with glass beaker 20 cm in diameter and 10 cm in height and left under ambient conditions (22° C., 40% relative humidity) with 2,2,2-trifluoroethanol vapours inside. The glass beaker had a magnetic stir plate mounted to it on the top outer side and a magnetic stir bar on the inside top surface with aluminium foil wrapped around it to form a propeller. The stir plate was switched on to rotate the stir bar at 200 rpm. This construction allowed for circulation of the atmosphere containing the 2,2,2-trifluoroethanol vapour inside the glass beaker. The mixture of 90% water by weight and 10% ethanol by weight penetrated porous membranes #1-7 made of PTFE and polypropylene with the assistance of the vapours of the low surface tension fluid 2,2,2-trifluoroethanol as was evidenced by visual clarification of the membranes. The visual clarification of the membranes presented as a transition from opaque, white coloured membranes to semi-transparent wetted membranes. The time to clarification of the whole area of the membrane defined by 2.5 cm inner diameter of PVC frame for each laminate is given in Table 3.

coating was accomplished using a polypropylene pipet, delivering 0.1 mL of the IEM solution as a droplet onto the glass sheet. While the coating was still wet, each of the low surface energy porous membranes previously restrained on the plastic frames were placed over the separate droplets of IEM solution to provide a laminate structure of mixture and membrane. Metal washers of 22.5 grams, having an inner diameter of 2 cm and an outer diameter of 4.5 cm were placed on top of the PVC frames to maintain the laminate structure. Next, a ceramic crucible at room temperature, of 5 cm height and 3 cm diameter at its top was placed in the centre of the circle defined by the laminates. A laboratory tissue paper (Kimwipes, Kimberly Clark) was crumpled by hand and placed into the crucible. Next, a 1 ml sample of 2,2,2-trifluoroethanol was delivered to the wipe via a graduated syringe. The laminates and crucible were covered with glass beaker 20 cm in diameter and 10 cm in height and left under ambient conditions (22° C., 40% relative humidity) with 2,2,2-trifluoroethanol vapours inside. The glass beaker had a magnetic stir plate mounted to it on the top outer side

TABLE 3

| | Low surface energy | High surf. ten. liquid | | Low surf. ten. fluid | | Temperature of crucible | Wetting time 0.1 ml high |
|---|---|---|---|---|---|---|---|
| Example # | support Low surface energy support ID | Name | Surface tension [dyne/cm (µN/cm)] | Name | Surface tension [dyne/cm (µN/cm)] | with Low surf. tension fluid [° C.] | surf. ten. liquid volume [s] |
| 1.1 | 1 | 90%/10% Water/Ethanol | 48 (480) | 2,2,2-trifluoroethanol | 17 (170) | RT | 654 |
| 1.2 | 2 | 90%/10% Water/Ethanol | 48 (480) | 2,2,2-trifluoroethanol | 17 (170) | RT | 860 |
| 1.3 | 3 | 90%/10% Water/Ethanol | 48 (480) | 2,2,2-trifluoroethanol | 17 (170) | RT | 742 |
| 1.4 | 4 | 90%/10% Water/Ethanol | 48 (480) | 2,2,2-trifluoroethanol | 17 (170 | RT | 607 |
| 1.5 | 5 | 90%/10% Water/Ethanol | 48 (480) | 2,2,2-trifluoroethanol | 17 (170) | RT | 424 |
| 1.6 | 6 | 90%/10% Water/Ethanol | 48 (480) | 2,2,2-trifluoroethanol | 17 (170) | RT | 563 |
| 1.7 | 7 | 90%/10% Water/Ethanol | 48 (480 | 2,2,2-trifluoroethanol | 17 (170) | RT | 531 |

*RT = room temperature.

Examples 1.1-1.7

Example 2

Examples 2.1-2.7 were made according to the following procedure. Low surface tension membrane substrates 1-7 as defined in Table 1 above were hand strained to eliminate wrinkles. Next each membrane was wrapped over one side of a cylindrical PVC plastic frame of 2.5 cm inner diameter, 3.4 cm outer diameter and 0.5 cm height. Next, a rubber O-ring was placed over the porous membrane restrained over the plastic frame in order to secure the membrane to the frame. Next, droplets of IEM solution with EW=810 g/mole eq. (obtained from Asahi Glass Company, product number IW100-800), comprising 61.6% water by weight, 26.4% ethanol by weight, 12% solids by weight, were applied onto a glass sheet in seven separate locations in a pattern of a circle with diameter of about 12 cm. The IEM solution and a magnetic stir bar on the inside top surface with aluminium foil wrapped around it to form a propeller. The stir plate was switched on to rotate the stir bar at 200 rpm. This construction allowed for circulation of the atmosphere containing the 2,2,2-trifluoroethanol vapour inside the glass beaker. The IEM solution penetrated porous membranes #1-7 made of PTFE and polypropylene with the assistance of the vapours of the low surface tension fluid 2,2,2-trifluoroethanol as was evidenced by visual clarification of the membranes. The visual clarification of the membranes presented as a transition from opaque, white coloured membranes to semi-transparent wetted membranes. The time to clarification of the whole area of the membrane defined by 2.5 cm inner diameter of PVC frame for each laminate is given in Table 4.

TABLE 4

| | | | | | | | Temperature of crucible | Wetting time 0.1 ml high |
| | Low surface energy | High surf. ten. liquid | | Low surf. ten. fluid | | | | |
| Example # | support Low surface energy support ID | Name | Surface tension [dyne/cm (μN/cm)] | Name | Surface tension [dyne/cm (μN/cm)] | | with Low surf. tension fluid [° C.] | surf. ten. liquid volume [s] |
|---|---|---|---|---|---|---|---|---|
| 2.1 | 1 | IW100-800 12% in 70/30 Water/Ethanol | 32 (320) | 2,2,2-trifluoroethanol | 17 (170) | | RT | 136 |
| 2.2 | 2 | IW100-800 12% in 70/30 Water/Ethanol | 32 (320) | 2,2,2-trifluoroethanol | 17 (170) | | RT | 162 |
| 2.3 | 3 | IW100-800 12% in 70/30 Water/Ethanol | 32 (320) | 2,2,2-trifluoroethanol | 17 (170) | | RT | 128 |
| 2.4 | 4 | IW100-800 12% in 70/30 Water/Ethanol | 32 (320) | 2,2,2-trifluoroethanol | 17 (170) | | RT | 121 |
| 2.5 | 5 | IW100-800 12% in 70/30 Water/Ethanol | 32 (320) | 2,2,2-trifluoroethanol | 17 (170) | | RT | 78 |
| 2.6 | 6 | IW100-800 12% in 70/30 Water/Ethanol | 32 (320) | 2,2,2-trifluoroethanol | 17 (170) | | RT | 100 |
| 2.7 | 7 | IW100-800 12% in 70/30 Water/Ethanol | 32 (320) | 2,2,2-trifluoroethanol | 17 (170) | | RT | 105 |

*RT = room temperature.

Example 3

Examples 3.1-3.7 were made according to the following procedure. Low surface tension membrane substrates 1-7 as defined in Table 1 above were hand strained to eliminate wrinkles. Next each membrane was wrapped over one side of a cylindrical PVC plastic frame of 2.5 cm inner diameter, 3.4 cm outer diameter and 0.5 cm height. Next, a rubber O-ring was placed over the porous membrane restrained over the plastic frame in order to secure the membrane to the frame. Next, droplets of water-ethanol mixture with composition of 90% water by weight and 10% ethanol by weight were applied onto a glass sheet in seven separate locations in a pattern of a circle with diameter of about 12 cm. The water-ethanol mixture coating was accomplished using a polypropylene pipet, delivering 0.1 mL of the water-ethanol mixture as a droplet onto the glass sheet. While the coating was still wet, each of the low surface energy porous membranes previously restrained on the plastic frames were placed over the separate droplets of water-ethanol mixture to provide a laminate structure of mixture and membrane. Metal washers of 22.5 grams, having an inner diameter of 2 cm and an outer diameter of 4.5 cm were placed on top of the PVC frames to maintain the laminate structure. Next, a ceramic crucible at room temperature, of 5 cm height and 3 cm diameter at its top was placed in the centre of the circle defined by the laminates. A laboratory tissue paper (Kimwipes, Kimberly Clark) was crumpled by hand and placed into the crucible. Next, a 1 ml sample of 1-butanol was delivered to the wipe via a graduated syringe. The laminates and crucible were covered with glass beaker 20 cm in diameter and 10 cm in height and left under ambient conditions (22° C., 40% relative humidity) with 1-butanol vapours inside. The glass beaker had a magnetic stir plate mounted to it on the top outer side and a magnetic stir bar on the inside top surface with aluminium foil wrapped around it to form a propeller. The stir plate was switched on to rotate the stir bar at 200 rpm. This construction allowed for circulation of the atmosphere containing the 1-butanol vapour inside the glass beaker. The water-ethanol mixture penetrated porous membranes #1-7 made of PTFE and polypropylene with the assistance of the vapours of the low surface tension fluid 1-butanol as was evidenced by visual clarification of the membranes. The visual clarification of the membranes presented as a transition from opaque, white coloured membranes to semi-transparent wetted membranes. The time to clarification of the whole area of the membrane defined by 2.5 cm inner diameter of PVC frame for each laminate is given in Table 5.

TABLE 4

| | | | | | | | Temperature | Wetting time |
| | Low surface energy | | High surf. ten. liquid | | Low surf. ten. fluid | | of crucible | 0.1 ml high |
| Example # | support Low surface energy support ID | Name | Surface tension [dyne/cm (μN/cm)] | Name | Surface tension [dyne/cm (μN/cm)] | | with Low surf. tension fluid [° C.] | surf. ten. liquid volume [s] |
|---|---|---|---|---|---|---|---|---|
| 3.1 | 1 | 90%/10% Water/Ethanol | 48 (480) | 1-butanol | 25 (250) | | RT | 742 |
| 3.2 | 2 | 90%/10% Water/Ethanol | 48 (480) | 1-butanol | 25 (250) | | RT | 815 |
| 3.3 | 3 | 90%/10% Water/Ethanol | 48 (480) | 1-butanol | 25 (250) | | RT | 487 |
| 3.4 | 4 | 90%/10% Water/Ethanol | 48 (480) | 1-butanol | 25 (250) | | RT | 474 |
| 3.5 | 5 | 90%/10% Water/Ethanol | 48 (480) | 1-butanol | 25 (250) | | RT | 415 |
| 3.6 | 6 | 90%/10% Water/Ethanol | 48 (480) | 1-butanol | 25 (250) | | RT | 689 |
| 3.7 | 7 | 90%/10% Water/Ethanol | 48 (480) | 1-butanol | 25 (250) | | RT | 495 |

*RT = room temperature.

Example 4

Examples 4.1-4.7 were made according to the following procedure. Low surface tension membrane substrates 1-7 as defined in Table 1 above were hand strained to eliminate wrinkles. Next each membrane was wrapped over one side of a cylindrical PVC plastic frame of 2.5 cm inner diameter, 3.4 cm outer diameter and 0.5 cm height. Next, a rubber O-ring was placed over the porous membrane restrained over the plastic frame in order to secure the membrane to the frame. Next, droplets of IEM solution with EW=810 g/mole eq. (obtained from Asahi Glass Company, product number IW100-800), comprising 61.6% water by weight, 26.4% ethanol by weight, 12% solids by weight, were applied onto a glass sheet in seven separate locations in a pattern of a circle with diameter of about 12 cm. The IEM solution coating was accomplished using a polypropylene pipet, delivering 0.1 mL of the IEM solution as a droplet onto the glass sheet. While the coating was still wet, each of the low surface energy porous membranes previously restrained on the plastic frames were placed over the separate droplets of IEM solution to provide a laminate structure of mixture and membrane. Metal washers of 22.5 grams, having an inner diameter of 2 cm and an outer diameter of 4.5 cm were placed on top of the PVC frames to maintain the laminate structure. Next, a ceramic crucible at room temperature, of 5 cm height and 3 cm diameter at its top was placed in the centre of the circle defined by the laminates. A laboratory tissue paper (Kimwipes, Kimberly Clark) was crumpled by hand and placed into the crucible. Next, a 1 ml sample of 1-butanol was delivered to the wipe via a graduated syringe. The laminates and crucible were covered with glass beaker 20 cm in diameter and 10 cm in height and left under ambient conditions (22° C., 40% relative humidity) with 1-butanol vapours inside. The glass beaker had a magnetic stir plate mounted to it on the top outer side and a magnetic stir bar on the inside top surface with aluminium foil wrapped around it to form a propeller. The stir plate was switched on to rotate the stir bar at 200 rpm. This construction allowed for circulation of the atmosphere containing the 1-butanol vapour inside the glass beaker. The IEM solution penetrated porous membranes #1-7 made of PTFE and polypropylene with the assistance of the vapours of the low surface tension fluid 1-butanol as was evidenced by visual clarification of the membranes. The visual clarification of the membranes presented as a transition from opaque, white coloured membranes to semi-transparent wetted membranes. The time to clarification of the whole area of the membrane defined by 2.5 cm inner diameter of PVC frame for each laminate is given in Table 6.

TABLE 6

| | | | | | | | Temperature | Wetting time |
| | Low surface energy | | High surf. ten. liquid | | Low surf. ten. fluid | | of crucible | 0.1 ml high |
| Example # | support Low surface energy support ID | Name | Surface tension [dyne/cm (μN/cm)] | Name | Surface tension [dyne/cm (μN/cm)] | | with Low surf. tension fluid [° C.] | surf. ten. liquid volume [s] |
|---|---|---|---|---|---|---|---|---|
| 4.1 | 1 | IW100-800 12% in 70/30 Water/Ethanol | 32 (320) | 1-butanol | 25 | | RT | 562 |
| 4.2 | 2 | IW100-800 12% in 70/30 Water/Ethanol | 32 (320) | 1-butanol | 25 | | RT | 535 |

TABLE 6-continued

| | Low surface energy | High surf. ten. liquid | | Low surf. ten. fluid | | Temperature of crucible | Wetting time 0.1 ml high |
|---|---|---|---|---|---|---|---|
| Example # | support Low surface energy support ID | Name | Surface tension [dyne/cm (μN/cm)] | Name | Surface tension [dyne/cm (μN/cm)] | with Low surf. tension fluid [° C.] | surf. ten. liquid volume [s] |
| 4.3 | 3 | IW100-800 12% in 70/30 Water/Ethanol | 32 (320) | 1-butanol | 25 | RT | 490 |
| 4.4 | 4 | IW100-800 12% in 70/30 Water/Ethanol | 32 (320) | 1-butanol | 25 | RT | 483 |
| 4.5 | 5 | IW100-800 12% in 70/30 Water/Ethanol | 32 (320) | 1-butanol | 25 | RT | 367 |
| 4.6 | 6 | IW100-800 12% in 70/30 Water/Ethanol | 32 (320) | 1-butanol | 25 | RT | 451 |
| 4.7 | 7 | IW100-800 12% in 70/30 Water/Ethanol | 32 (320) | 1-butanol | 25 | RT | 398 |

*RT = room temperature.

Example 5

Examples 5.1-5.7 were made according to the following procedure. Low surface tension membrane substrates 1-7 as defined in Table 1 above were hand strained to eliminate wrinkles. Next each membrane was wrapped over one side of a cylindrical PVC plastic frame of 2.5 cm inner diameter, 3.4 cm outer diameter and 0.5 cm height. Next, a rubber O-ring was placed over the porous membrane restrained over the plastic frame in order to secure the membrane to the frame. Next, droplets of water-ethanol mixture with composition of 90% water by weight and 10% ethanol by weight were applied onto a glass sheet in seven separate locations in a pattern of a circle with diameter of about 12 cm. The water-ethanol mixture coating was accomplished using a polypropylene pipet, delivering 0.1 mL of the water-ethanol mixture as a droplet onto the glass sheet. While the coating was still wet, each of the low surface energy porous membranes previously restrained on the plastic frames were placed over the separate droplets of water-ethanol mixture to provide a laminate structure of mixture and membrane. Metal washers of 22.5 grams, having an inner diameter of 2 cm and an outer diameter of 4.5 cm were placed on top of the PVC frames to maintain the laminate structure. Next, a ceramic crucible that was heated to temperature of 100° C. in an oven immediately prior to the experiment, of 5 cm height and 3 cm diameter at its top was placed in the centre of the circle defined by the laminates. A laboratory tissue paper (Kimwipes, Kimberly Clark) was crumpled by hand and placed into the crucible. Next, a 1 ml sample of 1-butanol was delivered to the wipe via a graduated syringe. The laminates and crucible were covered with glass beaker 20 cm in diameter and 10 cm in height and left with 1-butanol vapours inside. The glass beaker had a magnetic stir plate mounted to it on the top outer side and a magnetic stir bar on the inside top surface with aluminium foil wrapped around it to form a propeller. The stir plate was switched on to rotate the stir bar at 200 rpm. This construction allowed for circulation of the atmosphere containing the 1-butanol vapour inside the glass beaker. The water-ethanol mixture penetrated porous membranes #1-7 made of PTFE and polypropylene with the assistance of the vapours of the low surface tension fluid 1-butanol as was evidenced by visual clarification of the membranes. The visual clarification of the membranes presented as a transition from opaque, white coloured membranes to semi-transparent wetted membranes. The time to clarification of the whole area of the membrane defined by 2.5 cm inner diameter of PVC frame for each laminate is given in Table 7.

TABLE 7

| | Low surface energy | High surf. ten. liquid | | Low surf. ten. fluid | | Temperature of crucible | Wetting time 0.1 ml high |
|---|---|---|---|---|---|---|---|
| Example # | substrate Low surface energy substrate ID | Name | Surface tension [dyne/cm (μN/cm)] | Name | Surface tension [dyne/cm (μN/cm)] | with Low surf. tension fluid [° C.] | surf. ten. liquid volume [s] |
| 5.1 | 1 | 90%/10% Water/Ethanol | 48 (480) | 1-butanol | 25 | 100° C. | 467 |
| 5.2 | 2 | 90%/10% Water/Ethanol | 48 (480) | 1-butanol | 25 | 100° C. | 546 |
| 5.3 | 3 | 90%/10% Water/Ethanol | 48 (480) | 1-butanol | 25 | 100° C. | 307 |

TABLE 7-continued

| | Low surface energy | High surf. ten. liquid | | Low surf. ten. fluid | | Temperature of crucible | Wetting time 0.1 ml high |
|---|---|---|---|---|---|---|---|
| Example # | substrate Low surface energy substrate ID | Name | Surface tension [dyne/cm (µN/cm)] | Name | Surface tension [dyne/cm (µN/cm)] | with Low surf. tension fluid [° C.] | surf. ten. liquid volume [s] |
| 5.4 | 4 | 90%/10% Water/Ethanol | 48 (480) | 1-butanol | 25 | 100° C. | 453 |
| 5.5 | 5 | 90%/10% Water/Ethanol | 48 (480) | 1-butanol | 25 | 100° C. | 425 |
| 5.6 | 6 | 90%/10% Water/Ethanol | 48 (480) | 1-butanol | 25 | 100° C. | 408 |
| 5.7 | 7 | 90%/10% Water/Ethanol | 48 (480) | 1-butanol | 25 | 100° C. | 276 |

Example 6

Examples 6.1-6.7 were made according to the following procedure. Low surface tension membrane substrates 1-7 as defined in Table 1 above were hand strained to eliminate wrinkles. Next each membrane was wrapped over one side of a cylindrical PVC plastic frame of 2.5 cm inner diameter, 3.4 cm outer diameter and 0.5 cm height. Next, a rubber O-ring was placed over the porous membrane restrained over the plastic frame in order to secure the membrane to the frame. Next, droplets of IEM solution with EW=810 g/mole eq. (obtained from Asahi Glass Company, product number IW100-800), comprising 61.6% water by weight, 26.4% ethanol by weight, 12% solids by weight, were applied onto a glass sheet in seven separate locations in a pattern of a circle with diameter of about 12 cm. The IEM solution coating was accomplished using a polypropylene pipet, delivering 0.1 mL of the IEM solution as a droplet onto the glass sheet. While the coating was still wet, each of the low surface energy porous membranes previously restrained on the plastic frames were placed over the separate droplets of IEM solution to provide a laminate structure of mixture and membrane. Metal washers of 22.5 grams, having an inner diameter of 2 cm and an outer diameter of 4.5 cm were placed on top of the PVC frames to maintain the laminate structure. Next, a ceramic crucible at room temperature, of 5 cm height and 3 cm diameter at its top was placed in the centre of the circle defined by the laminates. A laboratory tissue paper (Kimwipes, Kimberly Clark) was crumpled by hand and placed into the crucible. Next, a 1 ml sample of 1-butanol was delivered to the wipe via a graduated syringe. The laminates and crucible were covered with glass beaker 20 cm in diameter and 10 cm in height and left under ambient conditions (22° C., 40% relative humidity) with ethyl acetate vapours inside. The glass beaker had a magnetic stir plate mounted to it on the top outer side and a magnetic stir bar on the inside top surface with aluminium foil wrapped around it to form a propeller. The stir plate was switched on to rotate the stir bar at 200 rpm. This construction allowed for circulation of the atmosphere containing the ethyl acetate vapour inside the glass beaker. The IEM solution penetrated porous membranes #1-7 made of PTFE and polypropylene with the assistance of the vapours of the low surface tension fluid ethyl acetate as was evidenced by visual clarification of the membranes. The visual clarification of the membranes presented as a transition from opaque, white coloured membranes to semi-transparent wetted membranes. The time to clarification of the whole area of the membrane defined by 2.5 cm inner diameter of PVC frame for each laminate is given in Table 8.

TABLE 8

| | Low surface energy | High surf. ten. liquid | | Low surf. ten. fluid | | Temperature of crucible | Wetting time 0.1 ml high |
|---|---|---|---|---|---|---|---|
| Example # | support Low surface energy support ID | Name | Surface tension [dyne/cm (µN/cm)] | Name | Surface tension [dyne/cm (µN/cm)] | with Low surf. tension fluid [° C.] | surf. ten. liquid volume [s] |
| 6.1 | 1 | IW100-800 12% in 70/30 Water/Ethanol | 32 (320) | Ethyl acetate | 24 (240) | RT | 593 |
| 6.2 | 2 | IW100-800 12% in 70/30 Water/Ethanol | 32 (320) | Ethyl acetate | 24 (240) | RT | 1124 |
| 6.3 | 3 | IW100-800 12% in 70/30 Water/Ethanol | 32 (320) | Ethyl acetate | 24 (240) | RT | 333 |
| 6.4 | 4 | IW100-800 12% in 70/30 Water/Ethanol | 32 (320) | Ethyl acetate | 24 (240) | RT | 765 |
| 6.5 | 5 | IW100-800 12% in 70/30 Water/Ethanol | 32 (320) | Ethyl acetate | 24 (240) | RT | 594 |

TABLE 8-continued

| | | | | Examples 6.1-6.7 | | | |
|---|---|---|---|---|---|---|---|
| | Low surface energy | | High surf. ten. liquid | | Low surf. ten. fluid | | Temperature of crucible | Wetting time 0.1 ml high |
| Example # | support Low surface energy support ID | Name | Surface tension [dyne/cm (µN/cm)] | Name | Surface tension [dyne/cm (µN/cm)] | with Low surf. tension fluid [° C.] | surf. ten. liquid volume [s] |
| 6.6 | 6 | IW100-800 12% in 70/30 Water/Ethanol | 32 (320) | Ethyl acetate | 24 (240) | RT | 732 |
| 6.7 | 7 | IW100-800 12% in 70/30 Water/Ethanol | 32 (320) | Ethyl acetate | 24 (240) | RT | 549 |

*RT = room temperature.

Example 7

Examples 7.1-7.7 were made according to the following procedure. Low surface tension membrane substrates 1-7 as defined in Table 1 above were hand strained to eliminate wrinkles. Next each membrane was wrapped over one side of a cylindrical PVC plastic frame of 2.5 cm inner diameter, 3.4 cm outer diameter and 0.5 cm height. Next, a rubber O-ring was placed over the porous membrane restrained over the plastic frame in order to secure the membrane to the frame. Next, droplets of IEM solution with EW=810 g/mole eq. (obtained from Asahi Glass Company, product number IW100-800), comprising 61.6% water by weight, 26.4% ethanol by weight, 12% solids by weight, were applied onto a glass sheet in seven separate locations in a pattern of a circle with diameter of about 12 cm. The IEM solution coating was accomplished using a polypropylene pipet, delivering 0.1 mL of the IEM solution as a droplet onto the glass sheet. While the coating was still wet, each of the low surface energy porous membranes previously restrained on the plastic frames were placed over the separate droplets of IEM solution to provide a laminate structure of mixture and membrane. Metal washers of 22.5 grams, having an inner diameter of 2 cm and an outer diameter of 4.5 cm were placed on top of the PVC frames to maintain the laminate structure. Next, a ceramic crucible at room temperature, of 5 cm height and 3 cm diameter at its top was placed in the centre of the circle defined by the laminates. A laboratory tissue paper (Kimwipes, Kimberly Clark) was crumpled by hand and placed into the crucible. Next, a 1 ml sample of diethyl ether was delivered to the wipe via a graduated syringe. The laminates and crucible were covered with glass beaker 20 cm in diameter and 10 cm in height and left under ambient conditions (22° C., 40% relative humidity) with diethyl ether vapours inside. The glass beaker had a magnetic stir plate mounted to it on the top outer side and a magnetic stir bar on the inside top surface with aluminium foil wrapped around it to form a propeller. The stir plate was switched on to rotate the stir bar at 200 rpm. This construction allowed for circulation of the atmosphere containing the diethyl ether vapour inside the glass beaker. The IEM solution penetrated porous membranes #1-7 made of PTFE and polypropylene with the assistance of the vapours of the low surface tension fluid diethyl ether as was evidenced by visual clarification of the membranes. The visual clarification of the membranes presented as a transition from opaque, white coloured membranes to semi-transparent wetted membranes. The time to clarification of the whole area of the membrane defined by 2.5 cm inner diameter of PVC frame for each laminate is given in Table 9.

TABLE 9

| | | | | Examples 7.1-7.7 | | | |
|---|---|---|---|---|---|---|---|
| | Low surface energy | | High surf. ten. liquid | | Low surf. ten. fluid | | Temperature of crucible | Wetting time 0.1 ml high |
| Example # | support Low surface energy support ID | Name | Surface tension [dyne/cm (µN/cm)] | Name | Surface tension [dyne/cm (µN/cm)] | with Low surf. tension fluid [° C.] | surf. ten. liquid volume [s] |
| 7.1 | 1 | IE100-800 12% in 70/30 Water/Ethanol | 32 (320) | Diethyl ether | 17 (170) | RT | 962[1] |
| 7.2 | 2 | IW100-800 12% in 70/30 Water/Ethanol | 32 (320) | Diethyl ether | 17 (170) | RT | 991[1] |
| 7.3 | 3 | IW100-800 12% in 70/30 Water/Ethanol | 32 (320) | Diethyl ether | 17 (170) | RT | 759[1] |
| 7.4 | 4 | IW100-800 12% in 70/30 Water/Ethanol | 32 (320) | Diethyl ether | 17 (170) | RT | 790 |
| 7.5 | 5 | IW100-800 12% in 70/30 Water/Ethanol | 32 (320) | Diethyl ether | 17 (170) | RT | 650 |
| 7.6 | 6 | IW100-800 | 32 (320) | Diethyl | 17 (170) | RT | 756 |

TABLE 9-continued

| | | | | | | Temperature | Wetting time |
|---|---|---|---|---|---|---|---|
| | Low surface energy | | High surf. ten. liquid | | Low surf. ten. fluid | of crucible | 0.1 ml high |
| Example # | support Low surface energy support ID | Name | Surface tension [dyne/cm (µN/cm)] | Name | Surface tension [dyne/cm (µN/cm)] | with Low surf. tension fluid [° C.] | surf. ten. liquid volume [s] |
| | | | | ether | | | |
| | | 12% in 70/30 Water/Ethanol | | | | | |
| 7.7 | 7 | IW100-800 | 32 (320) | Diethyl | 17 (170) | RT | 782 |
| | | 12% in 70/30 | | ether | | | |
| | | Water/Ethanol | | | | | |

*RT = room temperature.

¹ 0.15 ml of low surface tension fluid and 4 ml of high surface tension liquid used.

The foregoing Comparative Examples 1-4 illustrate that low surface energy substrates such as PTFE and PP are not spontaneously wetted with high surface tension liquids such as water and water/ethanol or water/ethanol/IEM mixtures. Comparative Example 4 illustrates the spontaneous wetting of a low surface energy PP substrate with acetonitrile, a liquid of comparable surface tension.

The foregoing Examples 1-7 illustrate the use of a low surface tension fluid such as 2,2,2-trifluoroethanol, 1-butanol, ethyl acetate and diethyl ether to facilitate the wetting of low surface energy substrates such as PTFE and PP with a high surface tension liquid such as water/ethanol and water/ethanol/IEM mixtures.

Modifications of the above embodiments, further embodiments and modifications thereof will be apparent to the skilled person on reading this disclosure, and as such these are within the scope of the present invention, as defined by the appended claims.

The invention claimed is:

1. A method of wetting a low surface energy substrate with a high surface tension liquid comprising at least the steps of:

providing a low surface energy substrate having a surface energy in the range of from 15 to 45 mN/m, providing a high surface tension liquid having a surface tension in the range of from greater than 25 to 70 mN/m and a low surface tension fluid having a surface tension in the range of from 10 to 25 mN/m;

contacting the low surface energy substrate with the high surface tension liquid;

evaporating the low surface tension fluid in an evaporation space to generate a vapor, and then, using a low surface tension fluid vapor applicator, contacting at least one of the low surface energy substrate and the high surface tension liquid with the vapor in a contacting space, either before, at the same time as or after the contacting of the low surface energy substrate with the high surface tension liquid; and removing the low surface tension fluid from the low surface energy substrate after the contacting with the low surface tension fluid as a vapour and after the contacting of the low surface energy substrate with the high surface tension liquid.

2. The method of claim 1 wherein the contacting at least one of the low surface energy substrate and the high surface tension liquid with the low surface tension fluid as a vapour comprises contacting the low surface energy substrate with the low surface tension fluid as a vapour before contacting the low surface energy substrate with the high surface tension liquid.

3. The method of claim 1 wherein the contacting at least one of the low surface energy substrate and the high surface tension liquid with the low surface tension fluid as a vapour comprises contacting the high surface tension liquid with the low surface tension fluid as a vapour before contacting the low surface energy substrate with the high surface tension liquid.

4. The method of claim 1 wherein the contacting at least one of the low surface energy substrate and the high surface tension liquid with the low surface tension fluid as a vapour comprises contacting both the low surface energy substrate and the high surface tension liquid with the low surface tension fluid as a vapour at the same time as contacting the low surface energy substrate with the high surface tension liquid.

5. The method of claim 1 wherein the contacting at least one of the low surface energy substrate and the high surface tension liquid with the low surface tension fluid as a vapour comprises contacting both the low surface energy substrate and the high surface tension liquid with the low surface tension fluid as a vapour after the low surface energy substrate has been contacted with the high surface tension liquid.

6. The method of claim 1 wherein the low surface energy substrate is one or more selected from the group comprising polytetrafluoroethylene, polytrifluoroethylene, polyvinylidene fluoride, polyvinylidene chloride, polychlorotrifluoroethylene; polyvinyl fluoride; polyvinyl chloride, polyethylene-co-tetrafluoroethylene, polytetrafluoroethylene-co-hexafluoropropylene, polyethylene, including ultra-high molecular weight polyethylene (UHMWPE), polypropylene, polystyrene, and poly (para-xylylene).

7. The method of claim 1 wherein the high surface tension liquid is a liquid composition comprising one or more high surface tension liquid components.

8. The method of claim 7 wherein the one or more high surface tension liquid components are selected from the group comprising water, diiodomethane, formamide, glycerol, 2,2'-thiobisethanol, 2-furanmethanol, ethylene glycol, 2-aminoethanol, 1,3-butandiol, propylene glycol, 1,2,3-tribromo propane, 1,5-pentanediol, N-methyl-2pyrrolidine, aniline, 2-aminoethanol, dimethyl sulfoxide, propylene carbonate, anthranilic acid ethylester, anthranilic acid methylester, benzyl alcohol, benzyl benzenoate, bromoform, quinoline, 1,3-diiodomethane, diethylene glycol, furfural, hexachlorobutadiene, iodobenzene, m-nitrotoluene, methyl naphthalene, N, N-dimethyl acetamide, N,N-dimethyl formamide, N-methyl-2-pyrrolidone, nitrobenzene, nitromethane, o-nitrotoluene, phenylisothiocyanate, phthalic acid diethylester, polyethylene glycol, pyridine, 3- pyridylcarbinol, pyrrole, tetrabromoethane, tricresylphosphate, α-bromonaphthalene, α-chloronaphthalene, 1,2-dichloroethane, 1,4-dioxane, carbon disulphide, chlorobenzene, cyclohexanol, cyclopentanol, decalin, dipropylene glycol, dodecyl benzene, fumaric acid diethylester, nitroethane, nitropropane, acetonitrile, propanoic acid, xylene and its isomers, dipropylene glycol monomethylether, toluene, butyronitrile, acetic acid, chloroform, acrylonitrile, 2-butoxyethanol, tetrachloromethane, 2-heptanone, dichloromethane, tetrahydrofuran, hexanol or its isomers, heptanol and its isomers, octanol and its isomers, and isovaleronitrile.

9. The method of claim 8 wherein, the liquid composition further comprises a low surface tension liquid component selected from one or more of the group comprising trifluoroethanol, diethyl ether, dimethoxymethane, silicon tetrachloride, butylchloride and its isomers, propanol and its isomers, ethanol, methanol, butanol and its isomers, pentanol and its isomers, acetone, ethyl acetate, methyl isobutyl ketone, propyl acetate, methyl ethyl ketone, methyl methacrylate, methyl acetate, acetone, methyl chloroform, ethanal, propanal, butanal, methylamine, ethylamine, propylamine, butylamine, and pentylamine.

10. The method of claim 1 wherein the low surface tension fluid is selected from one or more of the compounds selected from aldehydes, alcohols, amines, ketones, ethers, cyclic ethers, esters, organohalides, with the proviso that said compounds have a surface tension in a range of from 10 to 25 mN/m.

11. The method of claim 1 wherein the low surface tension fluid is selected from one or more of the group comprising, 2,2,2-trifluoroethanol, 1-butanol, ethyl acetate, and diethyl ether.

12. The method of claim 1 wherein the method of wetting is a method of coating the low surface energy substrate with the high surface tension liquid comprising a coating material, the method comprising at least the steps of:

providing a low surface energy substrate, a low surface tension fluid and a high surface tension liquid comprising a coating material;

contacting the low surface energy substrate with the high surface tension liquid comprising the coating material;

contacting at least one of the low surface energy substrate and the high surface tension liquid comprising the coating material with the low surface tension fluid as a vapour, either before, at the same time as or after the contacting of the low surface energy substrate with the high surface tension liquid comprising the coating material; and removing the low surface tension fluid from the low surface energy substrate.

13. The method of claim 12 wherein the method further comprises the step of:

removing the high surface tension liquid from the low surface energy substrate to provide a low surface energy substrate coated with the coating material.

14. The method of claim 12 wherein the low surface energy substrate is a porous ePTFE membrane and the coating material is an ion exchange material.

* * * * *